United States Patent
Mori et al.

(10) Patent No.: US 7,010,326 B2
(45) Date of Patent: Mar. 7, 2006

(54) MOBILE TELEPHONE SET AND DATA COMMUNICATION ADAPTOR

(75) Inventors: Shinichiro Mori, Kawasaki (JP); Masao Yamazawa, Kawasaki (JP); Akihide Nishiyama, Kawasaki (JP); Norishige Ihara, Kawasaki (JP); Hiroharu Seguchi, Kawasaki (JP); Toru Ogawa, Kawasaki (JP); Hitoshi Yamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/436,312

(22) Filed: May 12, 2003

(65) Prior Publication Data

US 2003/0195014 A1    Oct. 16, 2003

Related U.S. Application Data

(62) Division of application No. 09/112,176, filed on Jul. 8, 1998, now Pat. No. 6,625,471.

(30) Foreign Application Priority Data

Feb. 10, 1998 (JP) .............................. 10-028782
Mar. 19, 1998 (JP) .............................. 10-070773

(51) Int. Cl.
  *H04B 1/38* (2006.01)
(52) U.S. Cl. ............... 455/557; 455/558; 379/433.05; 379/447
(58) Field of Classification Search ............. 455/557, 455/558, 556.1, 556.2, 550.1, 90.1–90.3, 455/575.1, 575.6, 575.8, 537, 569; 379/433.01, 379/433.05, 433.09, 447, 443.13, 430; 439/345, 439/347, 217, 218, 221, 224, 650, 649, 946.1
See application file for complete search history.

(56) References Cited

U.S. PATENT DOCUMENTS

| 5,263,875 | A | * | 11/1993 | Spicer et al. | 439/367 |
| 5,409,394 | A |   | 4/1995  | Astier        |         |
| 5,505,633 | A | * | 4/1996  | Broadbent     | 439/329 |
| 5,566,226 | A | * | 10/1996 | Mizoguchi et al. | 455/558 |
| 5,644,471 | A | * | 7/1997  | Schultz et al. | 361/686 |
| 5,657,371 | A | * | 8/1997  | Suomi et al.  | 455/418 |
| 5,724,667 | A |   | 3/1998  | Fureno        |         |

(Continued)

FOREIGN PATENT DOCUMENTS

EP    0 434 231 A2 *  11/1990

(Continued)

*Primary Examiner*—Charles N. Appiah
(74) *Attorney, Agent, or Firm*—Katten Muchin Rosenman LLP

(57) ABSTRACT

A portable telephone set includes a telephone set main body and a flipper. The telephone set main body is provided with a hinge mechanism and a flipper joint plate. The flipper joint plate is pivotally supported by hinge modules and has a connector at an end thereof. The flipper is joined to the flipper joint plate. The flipper is provided with a cable accommodating portion in which a short cable with a connector is accommodated. The cable includes a short cable main body as long as, for example, 10 cm and two connectors at respective ends of the cable. For mobile communication, one of the connectors of the cable is taken out from the flipper and connected to an information processing device.

5 Claims, 22 Drawing Sheets

U.S. PATENT DOCUMENTS

| | | | |
|---|---|---|---|
| 5,793,989 A * | 8/1998 | Moss et al. | 710/105 |
| 5,809,432 A * | 9/1998 | Yamashita | 455/575.1 |
| 5,884,103 A * | 3/1999 | Terho et al. | 710/72 |
| 5,894,597 A * | 4/1999 | Schwartz et al. | 455/558 |
| 5,903,849 A * | 5/1999 | Selin et al. | 455/557 |
| 5,924,044 A * | 7/1999 | Vannatta et al. | 455/556.1 |
| 6,073,034 A | 6/2000 | Jacobsen et al. | |
| 6,189,056 B1 * | 2/2001 | Ogura et al. | 710/62 |
| 6,240,302 B1 * | 5/2001 | Harrison | 455/556.1 |
| 6,597,924 B1 * | 7/2003 | Smith | 455/557 |

FOREIGN PATENT DOCUMENTS

| | | |
|---|---|---|
| EP | 0 629 071 | 12/1994 |
| EP | 0 629 071 A1 * | 12/1994 |
| GB | 2 290 923 A * | 1/1996 |
| WO | WO 97/33384 A1 * | 9/1997 |

\* cited by examiner

FIG. 10A
FIG. 10B
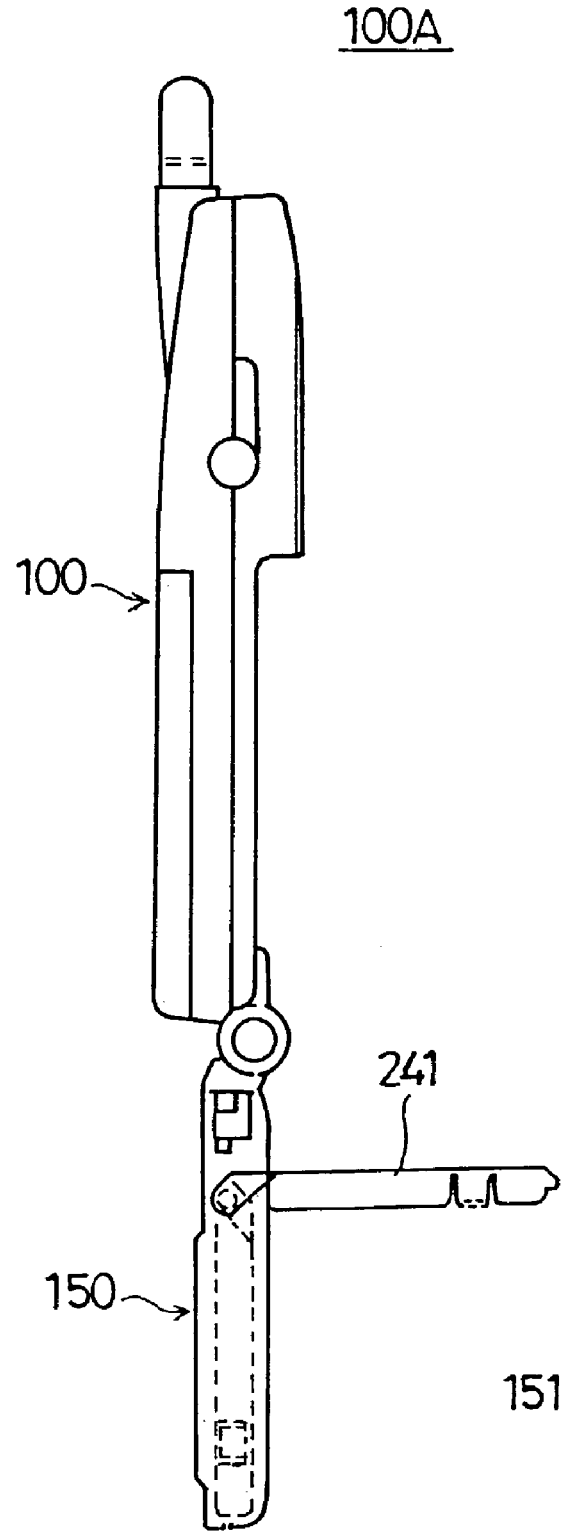
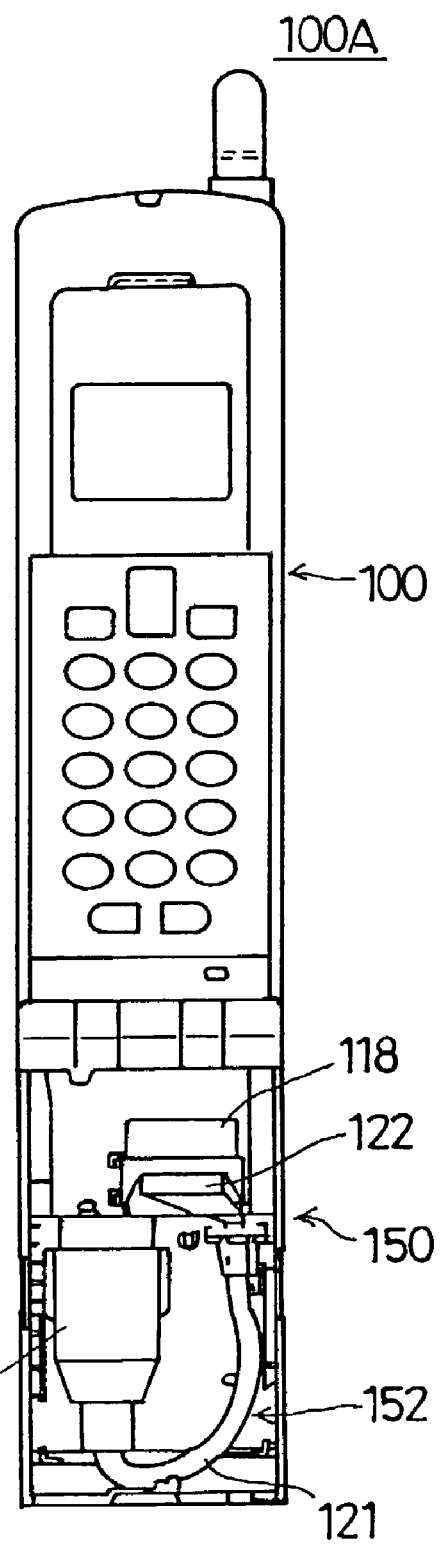

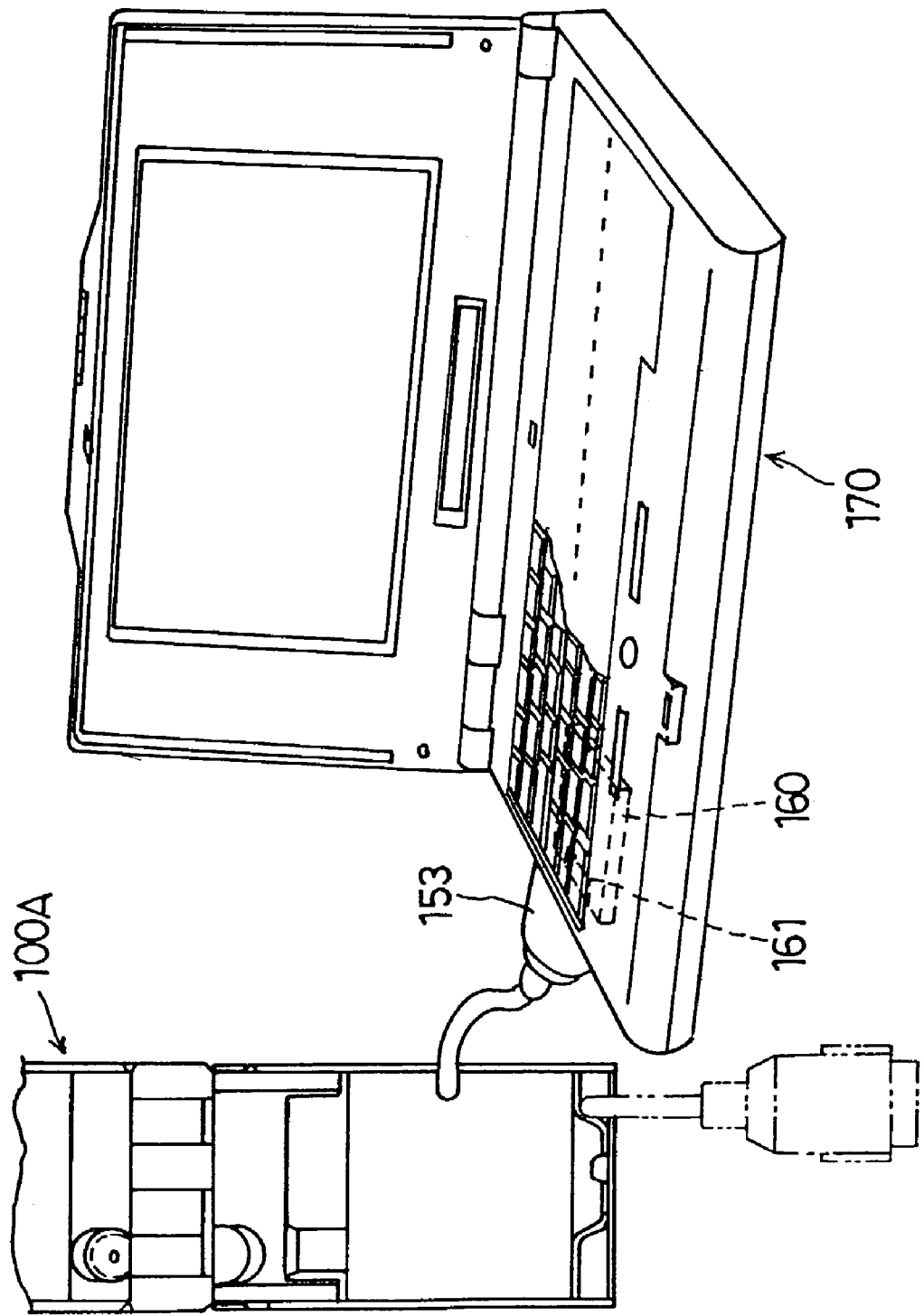

FIG. 13
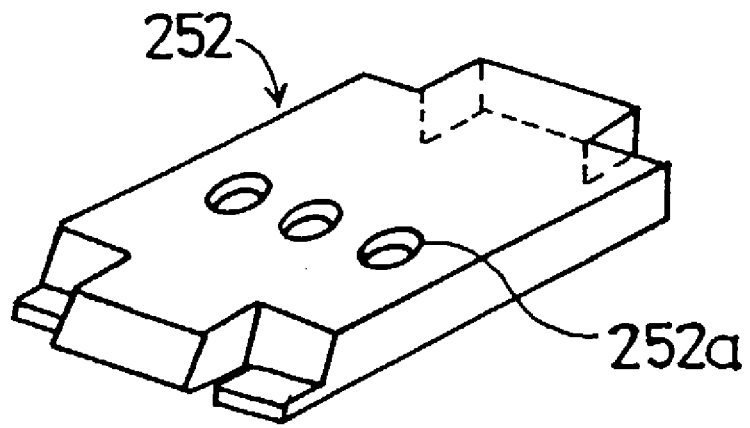
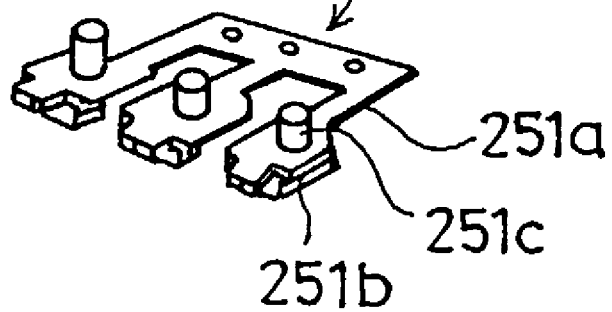
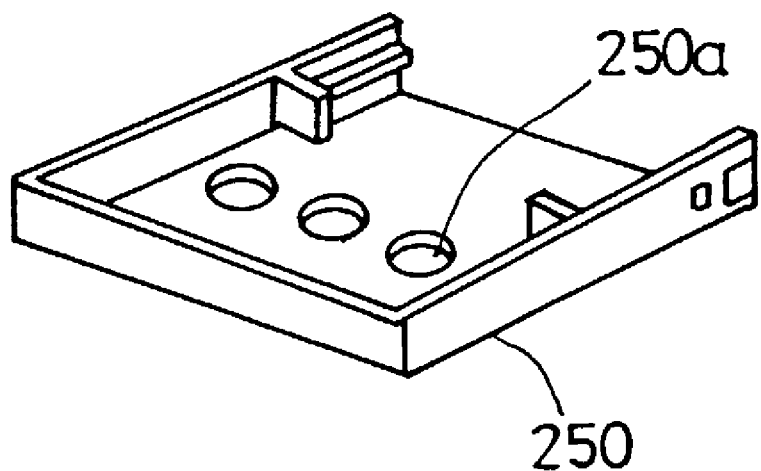

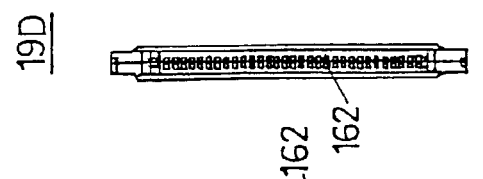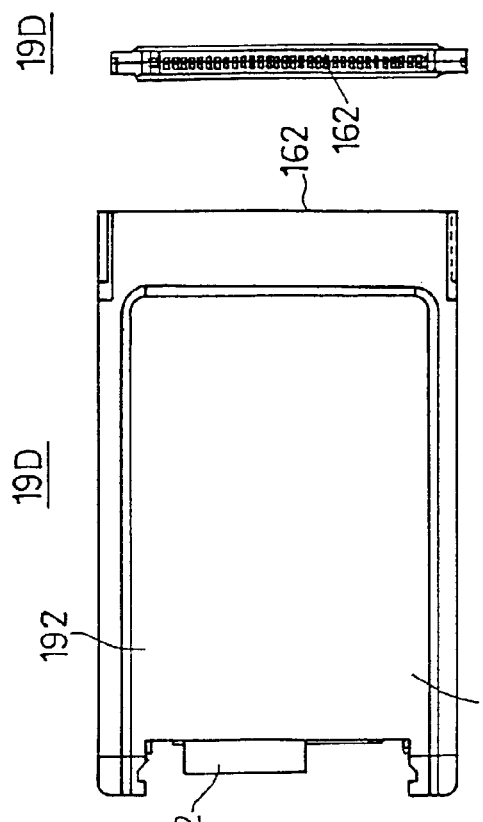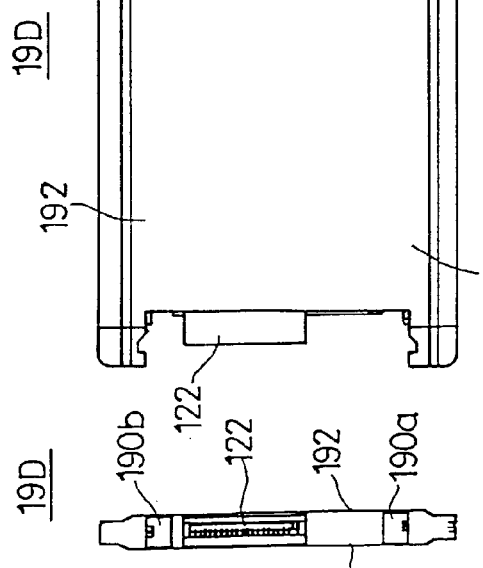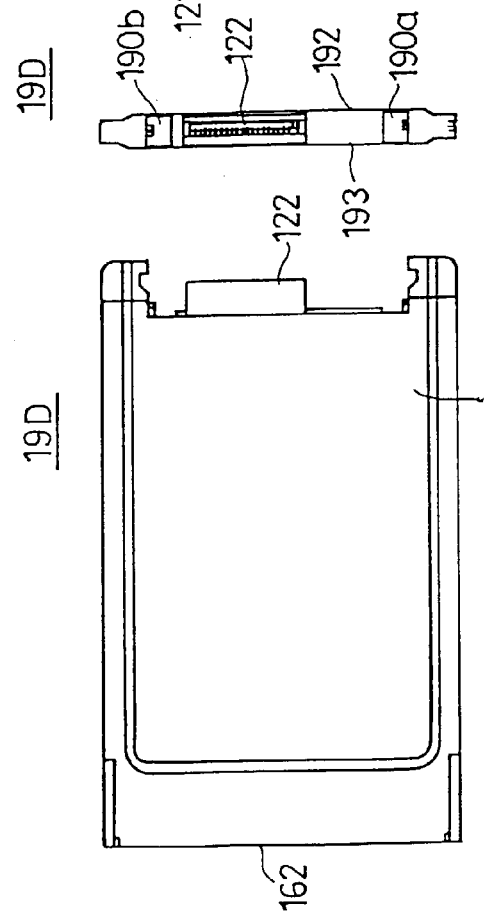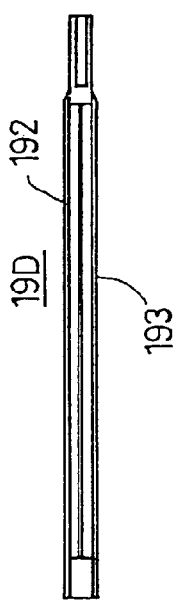

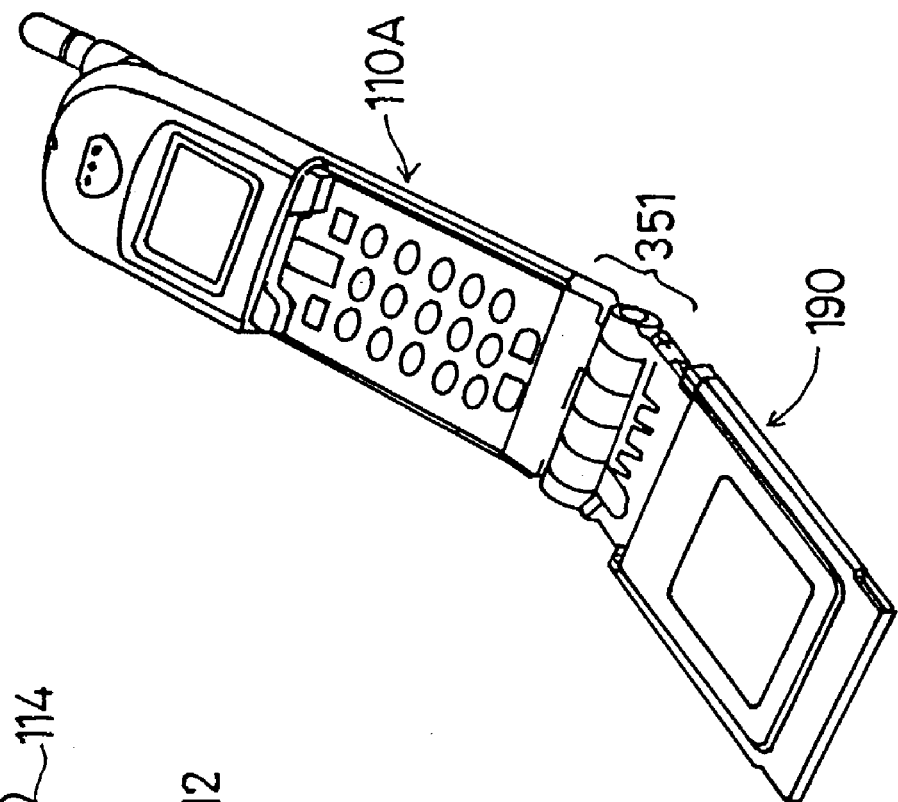
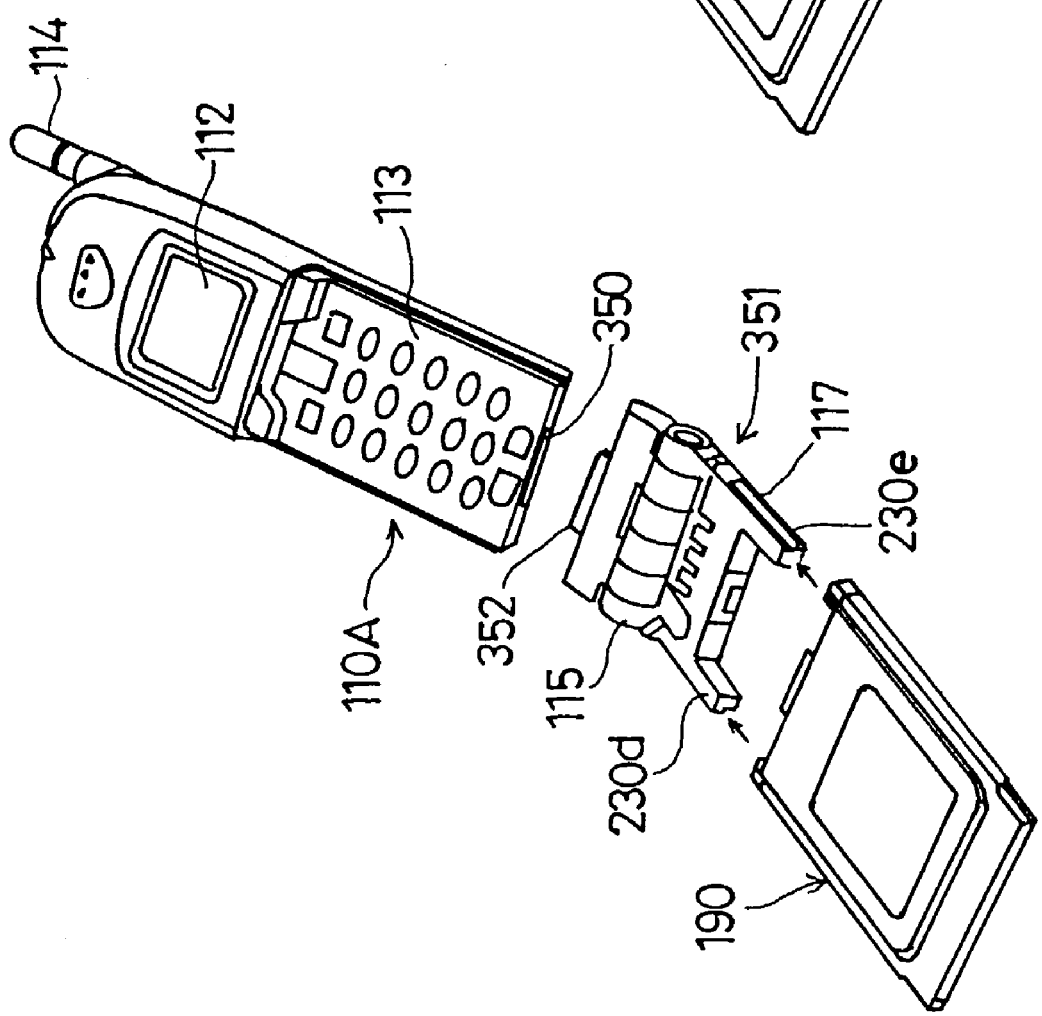

US 7,010,326 B2

MOBILE TELEPHONE SET AND DATA COMMUNICATION ADAPTOR

CROSS-REFERENCE TO RELATED APPLICATION

The present application is a divisional application of U.S. patent application Ser. No. 09/112,176, which was filed on Jul. 8, 1998 now U.S. Pat. No. 6,625,471 now pending.

BACKGROUND OF THE INVENTION

1. Field of the Invention

The present invention generally relates to portable telephone sets and data communication adaptors and, more particularly to a portable telephone set and a data communication adaptor used to build a mobile communication system that includes an information processing device.

Recently, portable telephone sets are being used not only for telephone communication but also used in combination with an information processing device for mobile communication. Accordingly, it is required that a portable telephone set be useful to build a mobile communication system.

2. Description of the Related Art

FIGS. 1A and 1B show a portable telephone set 10 according to the related art and how a mobile communication system is built using the portable telephone set 10.

The portable telephone set 10 has a connector 10a at the bottom thereof connectable to a connector of a cable.

FIG. 1A shows a mobile communication system 30 using an information processing device 20 not having a built-in data communication adaptor. The mobile communication system 30 is built using the information processing device 20, a cable 40 with connectors and a data communication adaptor 50. A connector 40a at an end of the cable 40 is connected to the connector 10a of the portable telephone set 10. A connector 40b at the other end of the cable 40 is connected to a connector 50a at an end of the data communication adaptor 50. The data communication adaptor 50 is inserted into a data communication adaptor accommodating unit 20a of the information processing device 20. A connector 50b at the other end of the data communication adaptor 50 is connected to a connector 20b at the rear end of the data communication adaptor accommodating unit 20a.

Normally, the data communication adaptor 50 is inserted into the data communication adaptor 20a of the information processing device 20.

FIG. 1B shows how a mobile communication system 30A is built using an information processing device 20A having a built-in data communication adaptor. The information processing device 20A has a built-in data communication adaptor 60. The mobile communication system 30A is built using the information processing device 20A, the cable 40 with the connectors. The connector 40a at an end of the cable 40 is connected to the connector 10a of the portable telephone set 10 and the connector 40b at the other end is connected to a connector 60a of the data communication adaptor 60 built into the information processing device 20A.

A user who intends to perform mobile communication carries the portable telephone set 10 with himself or herself. In addition, the user carries the information processing device 20 (20A) and the cable 40 in, for example, a bag. If the cable 40 connected to the information processing device 20 (20A) is accommodated in the bag, a intensive force is applied to the joint between the cable 40 and the information processing device 20 (20A), causing the joint to be damaged. For this reason, the cable 40 is disconnected from the information processing device 20 (20A) while being carried.

Therefore, the user may leave the cable 40 behind at home since it is comparatively small. If the cable 40 is lost, mobile communication is impossible.

Another inconvenience is that, since the cable 40 should be connected to the portable telephone set 10 as well as to the information processing device 20 (20A), it takes time to build a mobile communication system.

SUMMARY OF THE INVENTION

Accordingly, an object of the present invention is to provide a portable telephone set and a data communication adaptor in which the aforementioned problems are eliminated.

Another and more specific object of the present invention is to provide a portable telephone set and a data communication adaptor whereby a data communication system is more readily built than according to the related art.

The aforementioned objects can be achieved by a portable telephone set comprising: a telephone set main body; and a cable accommodating portion for accommodating a cable with a connector connectable with a mobile information processing device, wherein the cable is accommodated in the cable accommodating portion such that an end of the cable is electrically connected to the telephone set main body.

Since the cable with the connector is accommodated such that an end of the cable is electrically connected to the portable telephone set, it is not necessary for a user to carry the cable with him or her. The cable is not lost by any chance. For mobile communication, the user has only to take the cable out of the cable accommodating unit and is not required to connect the cable to the portable telephone set.

The aforementioned objects can also be achieved by a portable telephone set comprising: a telephone set main body; and a flipper attached to the telephone set main body, wherein the flipper includes a cable accommodating portion for accommodating a cable with a connector connectable with a mobile information processing device, and the cable is accommodated in the cable accommodating portion such that an end of the cable is electrically connected to the telephone set main body.

It is to be appreciated that it is easier to provide the cable accommodating unit in the flipper than in telephone set main body.

The aforementioned objects can also be achieved by a portable telephone set comprising: a telephone set main body; and a flipper detachably attached to the telephone set main body, wherein the telephone set main body includes a telephone set main body connector, the flipper includes a cable accommodating portion for accommodating a cable having a first connector connectable with a mobile information processing device at one end thereof and having a second connector connectable with the telephone set main body connector, the cable is accommodated in the cable accommodating portion such that the second connector is fixedly secured to the cable accommodating portion, and the flipper is mechanically joined to the telephone set main body in a state where the second connector is connected to the telephone set main body connector.

Since the flipper is independent of the telephone set main body and detachably coupled thereto, the telephone set main body may be used for a plurality of types of portable telephone sets for users who intend to perform mobile communication using a portable information processing device.

The aforementioned objects can also be achieved by a portable telephone set comprising: a telephone set main body; and a connector to which a data communication adaptor for use in data communication when the portable telephone set is connected to a mobile information processing device is electrically connected.

By directly connecting the data communication adaptor to the portable telephone set, it is possible to perform mobile communication using a portable information processing device not having a built-in data communication adaptor.

The aforementioned objects can also be achieved by a portable telephone set comprising: a telephone set main body; and a flipper detachably attached to the telephone set main body, wherein a portion of the telephone set main body connected to the flipper is provided with a connector electrically connected to a data communication adaptor used for data communication when the portable telephone set is connected to a mobile information processing device.

By removing the flipper and connecting the data communication adaptor to the portable telephone, it is possible to perform mobile communication using a portable information processing device not having a data communication adaptor The aforementioned objects can also be achieved by a card-like data communication adaptor used for data communication when a portable telephone set is connected to a mobile information processing device, comprising: a portable telephone set connector connectable to one of a portable telephone set and a connection adaptor connected to the portable telephone set; a mobile information processing device connector connectable with a mobile information processing device; and a mechanical supporting mechanism for mechanically maintaining a state where the portable telephone set connector is connected to one of the portable telephone set and the connection adaptor.

By providing a mechanical supporting mechanism, the moment caused by the weight of the portable telephone set is born by the mechanical supporting mechanism while mobile communication using the mobile communication system is proceeding so that a bending force is prevented from being exerted on the joint between the connectors.

The mechanical supporting mechanism may be embodied by holes to which arm portions projecting from the portable telephone set and the connection adaptor.

According to this aspect of the invention, it is easy to construct the mechanical supporting mechanism.

Each of the holes may be provided on an inner surface thereof with a rib portion engageable with a groove on a side of each of the arm portions.

By engaging the rib portion with the groove on the side of the arm portion, the mechanical support is reinforced.

The aforementioned objects can also be achieved by a card-like data communication adaptor used for data communication when a portable telephone set is connected to a mobile information processing device, comprising: an adaptor main body; a top shield plate formed of a metal and covering an upper major surface of the adaptor main body; and a bottom shield plate formed of a metal and covering a lower major surface of the adaptor main body, wherein the adaptor main body comprises: a portable telephone set connector electrically connectable to one of the portable telephone set and a connection adaptor connected to the portable telephone set; and a mobile information processing device connector connectable to a mobile information processing device, and wherein the card-like data communication adaptor further comprises: a mechanical supporting mechanism to which arm portions projecting from one of the portable telephone set and the connection adaptor are inserted and which mechanically supports the data communication adaptor with respect to one of the portable telephone set and connection adaptor, the mechanical supporting mechanism being embodied by holes formed by incisions provided in the adaptor main body and by portions of the top shield plate and the bottom shield covering the incisions.

Since the shield plate is a formed of metal, the shield plate is not easily deformed. Accordingly, the mechanical support is reinforced.

Each of the incisions in the adaptor main body may be provided at an inner surface thereof with a rib portion engageable with a groove provided on a side of each of the arm portions.

By engaging the rib portion with the groove provided on the side of the arm portion, the mechanical support is reinforced.

BRIEF DESCRIPTION OF THE DRAWINGS

Other objects and further features of the present invention will be apparent from the following detailed description when read in conjunction with the accompanying drawings, in which:

FIGS. 10A and 10B shows a portable telephone set according to the second embodiment;

FIG. 11 is a mobile communication system using the portable telephone set of FIGS. 10A and 10B;

FIG. 13 is an exploded perspective view of a flipper of FIG. 12;

FIGS. 17A–17E show a data communication adaptor;

FIGS. 22A and 22B show a variation of the telephone set main body.

DETAILED DESCRIPTION OF THE PREFERRED EMBODIMENTS

Figure 1A:
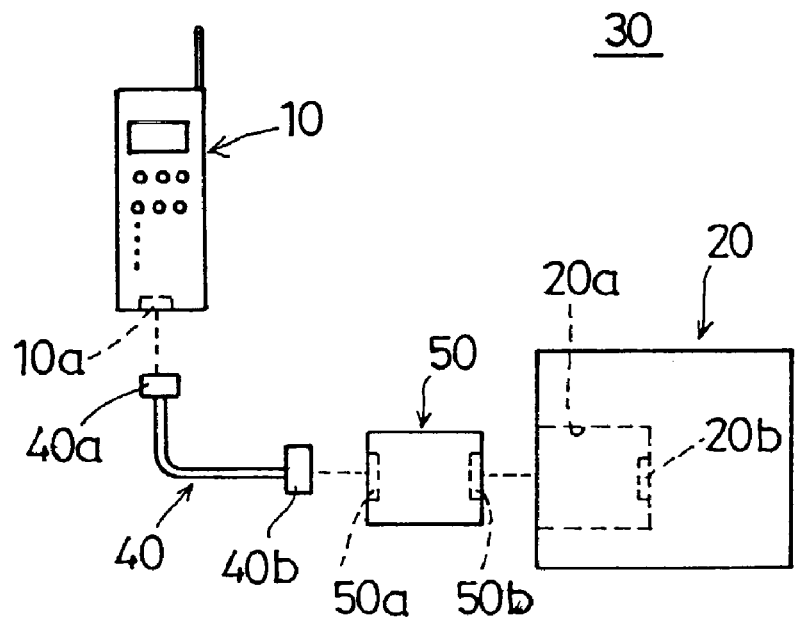
FIGS. 1A and 1B illustrate how a mobile communication system is built using a portable telephone set according to the related art.
Figure 1B:
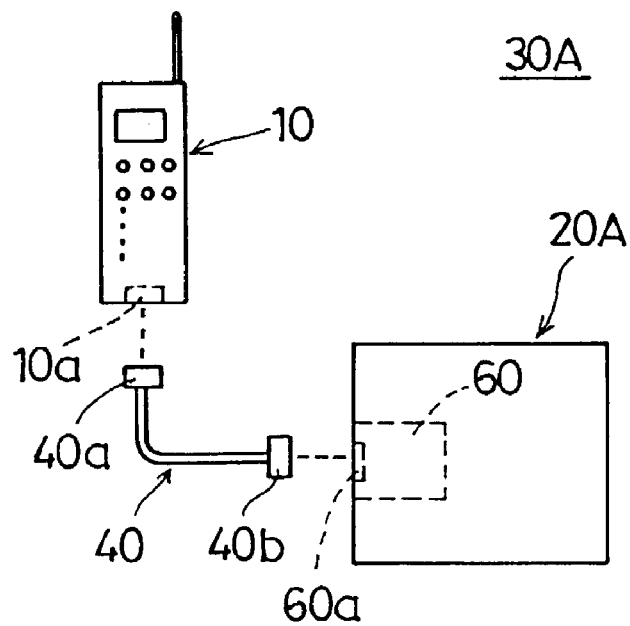
Figure 2:
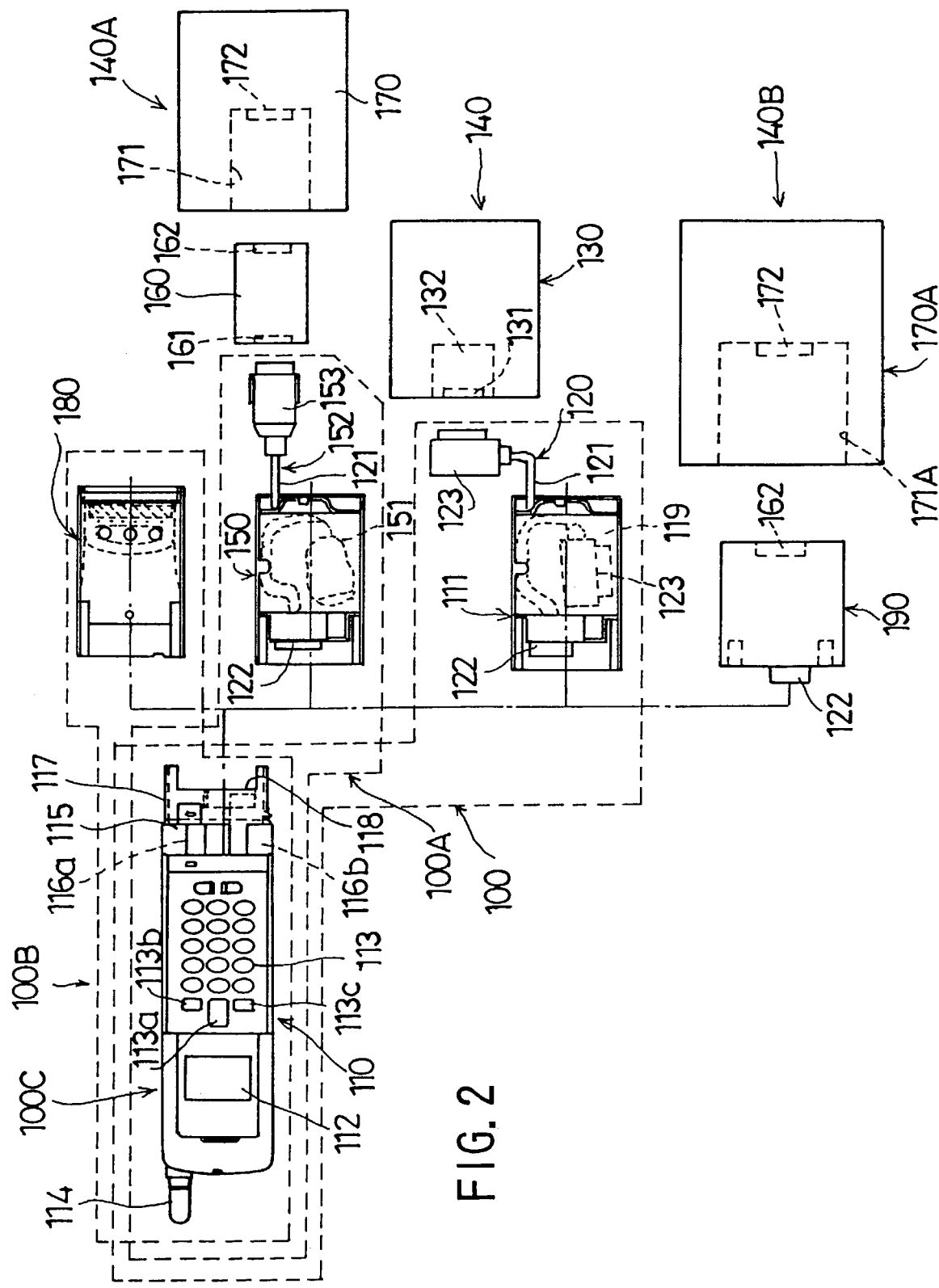
FIG. 2 shows portable telephone sets according to first, second third and fourth embodiments of the present invention and mobile communication systems using such telephone sets.

FIG. 2 shows portable telephone sets 100, 100A, 100B and 100C according to first, second, third and fourth embodiments, respectively, of the present invention and mobile communication systems using the portable telephone sets 100, 100A, 100B and 100C.

A schematic description will first be given. The portable telephone set 100 according to the first embodiment includes a telephone set main body 110 and a flipper 111. The telephone set main body 110 is used in the other embodiments as well. The portable telephone set 100 is adapted for a user who intends to perform mobile communication using a portable information processing device 130 having a built-in data communication adaptor.

The telephone set main body 110 includes a liquid crystal display unit 112, a group of operation buttons 113, an antenna 114, a hinge mechanism 115 and a flipper joint plate 117. The hinge mechanism 115 is provided with hinge modules 116a and 116b. The flipper joint plate 117 is pivotally supported by the hinge modules 116a and 116b. The flipper joint plate 117 has a telephone set main body connector 118 at an end thereof. The flipper 111 may sold by itself. The flipper 111 is joined with the telephone set main body 110 using the flipper joint plate 117. While the portable telephone set 100 is not used, the flipper 111 is closed so as to cover the group of operation buttons 113. When the user makes a telephone call or performs mobile communication, the flipper 111 is open.

The flipper 111 has a cable accommodating portion 119 having a short cable 120 with connectors accommodated therein. The short cable 120 comprises a short cable main body 121 as long as, for example, 10 cm, a connector 122 and a connector 123. The connector 122 of the short cable 120 is secured to the flipper 111. The short cable main body 121 in a bent state and the connector 123 are accommodated in the cable accommodating portion 119. The short cable main body 121 and the connector 123 of the short cable 120 are extractable from the cable accommodating portion 119 of the flipper 111. The connector 122 is connectable with the telephone set main body connector 118 and the connector 123 is connectable with a connector 131 of the mobile information processing device 130.

In a state in which the flipper 111 is connected to the flipper joint plate 117, the connector 122 is connected to the telephone set main body connector 118.

When the portable telephone set 100 is used for a telephone call, the short cable 120 remains accommodated in the flipper 111.

For mobile communication, a mobile communication system 140 is built by pulling out the connector 123 from the flipper 111 and connecting the same to the connector 131 of the information processing device 130 having a built-in data communication adaptor 132.

By providing the short cable main body 121, the flexibility of relative arrangement of the mobile information processing device 130 and the portable telephone set 100 is insured. By providing a distance between the mobile information processing device 130 and the portable telephone set 100, the operation is easy. No excessive stress is exerted on the joint between the connector 123 and the connector 131.

The portable telephone set 100A according to the second embodiment includes a telephone set main body 110 and a flipper 150 independent of the telephone set main body 110. The portable telephone set 100A is adapted for a user who intends to perform mobile communication using a portable information processing device 170 not having a built-in data communication adaptor.

The flipper 150 is connected to the flipper joint plate 117. The flipper 150 has a cable accommodating portion 151 having a short cable 152 with connectors accommodated therein. The short cable 152 comprises the short cable main body 121 as long as, for example, 10 cm, the connector 122 and the connector 153. The connector 122 of the short cable 152 is secured to the flipper 150. The short cable main body 121 in a bent state and the connector 153 are accommodated in the cable accommodating portion 151. The short cable main body 121 and the connector 153 of the short cable 152 are pulled out of the cable accommodating portion 151 of the flipper 150. The connector 122 is connectable with the telephone set main body connector 118 and the connector 153 is connectable with a connector 161 of a data communication adaptor 160.

In a state in which the flipper 150 is connected to the flipper joint plate 117, the connector 122 is connected to the telephone set main body connector 118.

When the portable telephone set 100A is used for a telephone call, the short cable 152 remains accommodated in the flipper 150.

For mobile communication, the flipper 150 is opened. The connector 153 is pulled out from the flipper 150 and connected to the connector 161 of the data communication adaptor 160. The data communication adaptor 160 is inserted in a data communication adaptor accommodating unit 171 of the information processing device 170 not having a built-in data communication adaptor. A connector 162 at the other end of the data communication adaptor 160 is connected to a connector 172 at the rear end of the data communication adaptor accommodating unit 171. Thus, simply by pulling out the connector 153 from the flipper 150 and connecting the connector 153 to the connector 161 of the data communication adaptor 160 inserted into the information processing device 170 not having a built-in data communication adaptor, a mobile communication system 140A is built.

By providing the short cable main body 121, the flexibility of relative arrangement of the mobile information processing device 170 and the portable telephone set 100A is insured. By providing a distance between the mobile information processing device 170 and the portable telephone set 100A, the operation is easy. No excessive stress is exerted on the joint between the connector 153 and the connector 161.

The portable telephone set 100B according to a third embodiment comprises the telephone set main body 110 and a flipper 180 independent of the telephone set main body 110. The portable telephone set 100B is adapted for a user who does not intend to perform mobile communication.

The flipper 180 is not provided with a cable and connected to the flipper joint plate 117.

The portable telephone set 100C according to the fourth embodiment comprises the telephone set main body 110. The telephone set main body 110 uses a data communication adaptor 190 dedicated to the telephone set main body 110. A mobile communication system 140A is built by using a mobile information processing device 170A not having a built-in data communication adaptor and adapted for the data communication adaptor 190.

The data communication adaptor 190 is connectable with the flipper joint plate 117 and includes connectors 122 and 162. The mobile information processing device 170A has a data communication adaptor accommodating unit 171A having the connector 172 at the rear end thereof.

The data communication adaptor 190 is connected to the flipper joint plate 117 such that the connector 122 is connected to the telephone set main body connector 118. The data communication adaptor 190 joined to the telephone set main body 110 is inserted into the data communication adaptor accommodating unit 171A. The connector 162 is connected to the connector 172 so that the data communication adaptor 190 is connected to the information processing device 170A. Thus, a mobile communication system 140B is built.

As described above, the telephone set main body 100 is used to construct the portable telephone sets 100, 100A, 100B and 100C, thus providing an economical advantage in producing the portable telephone sets 100, 100A, 100B and 100C.

A description will now be given of the portable telephone sets 100, 100A, 100B and 100C according to the respective embodiments.

[Portable Telephone Set 100 According to the First Embodiment]

Figure 3:
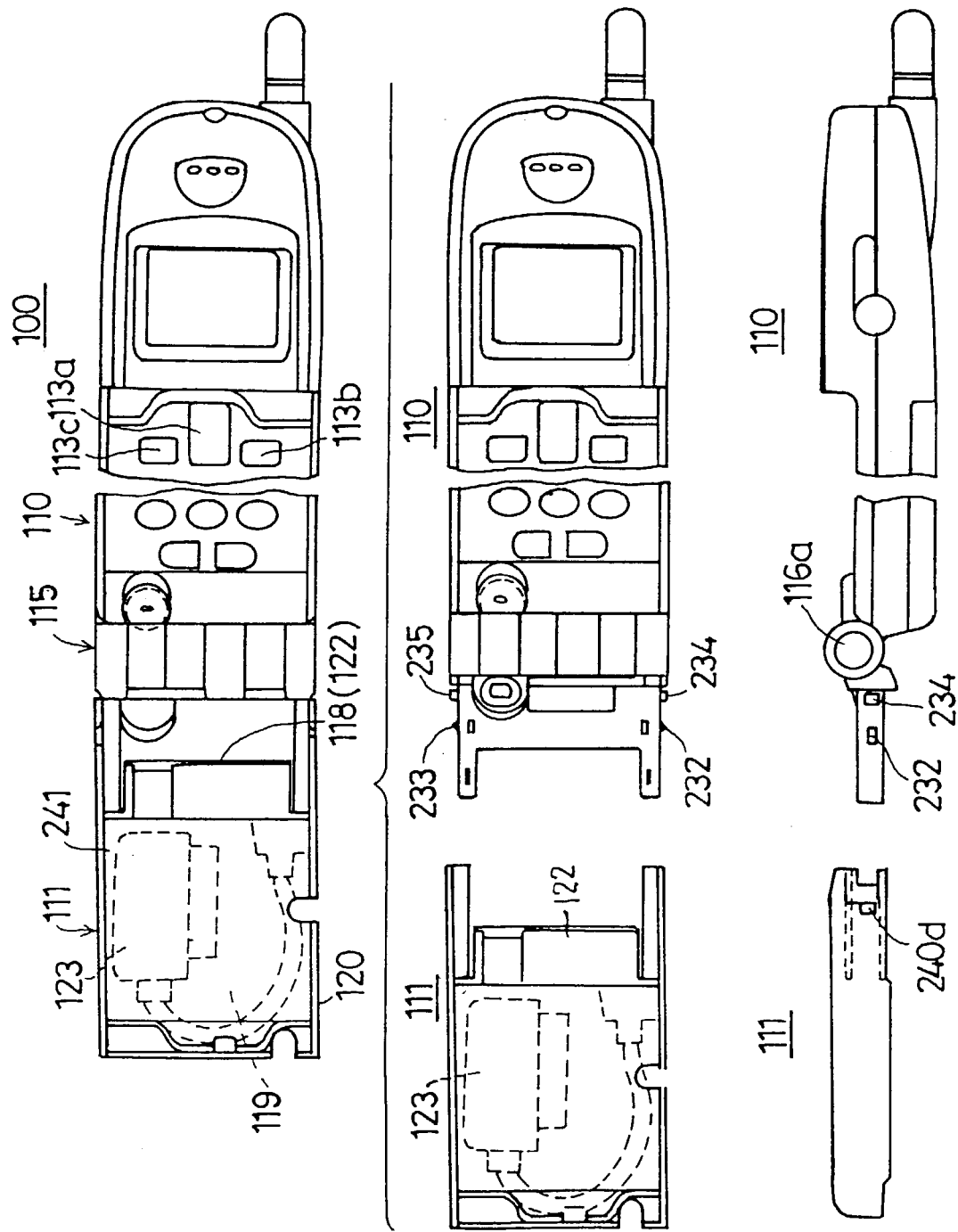
FIG. 3 shows a portable telephone set according to the first embodiment.

As shown in FIG. 3, the portable telephone set 100 is constructed such that the flipper 111 is mechanically and electrically connected to the telephone set main body 110.

A description will be given of the telephone set main body 110.

Figure 4:
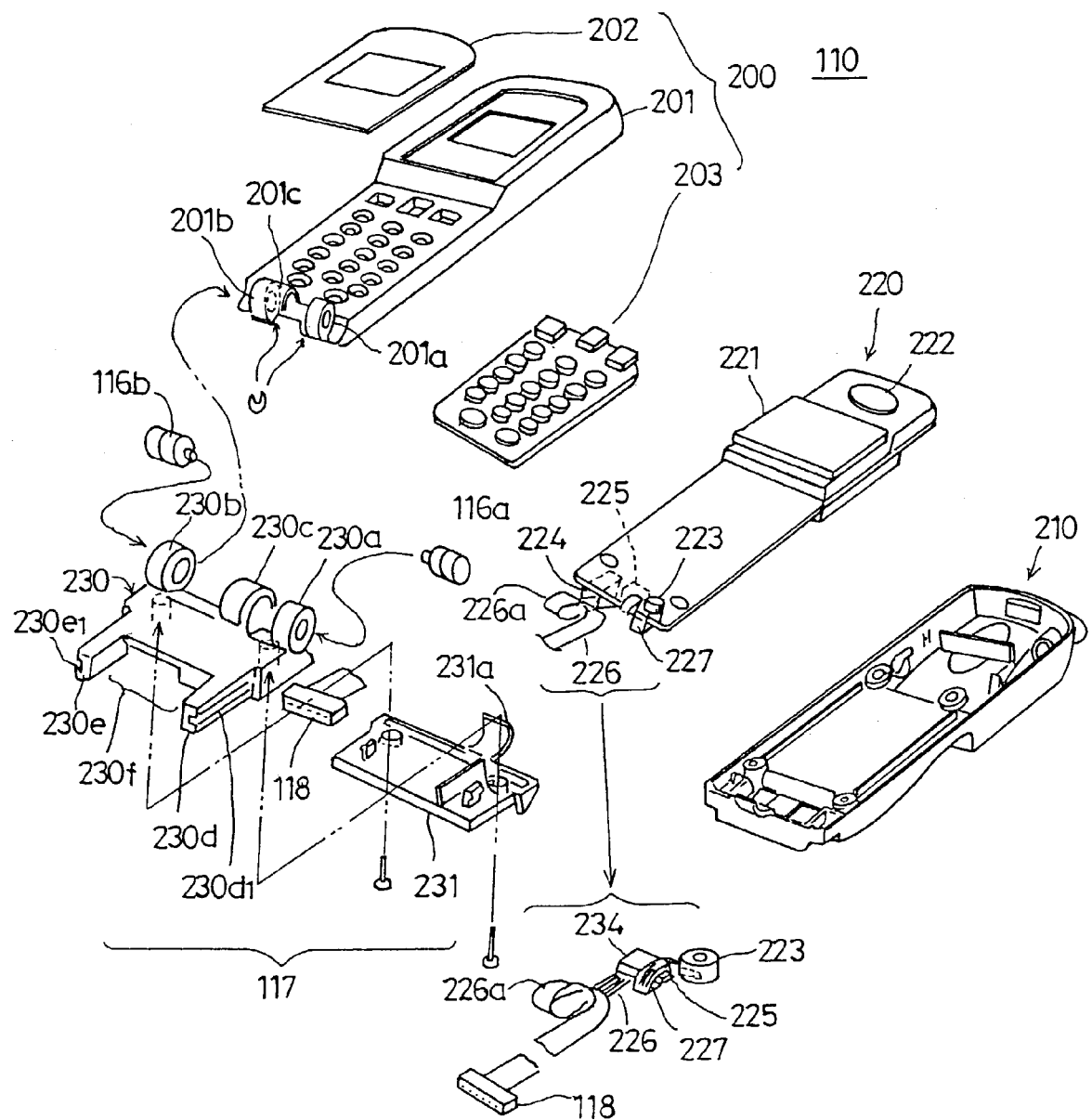
FIG. 4 is an exploded perspective view of a telephone set main body of FIG. 3.
Figure 5A:
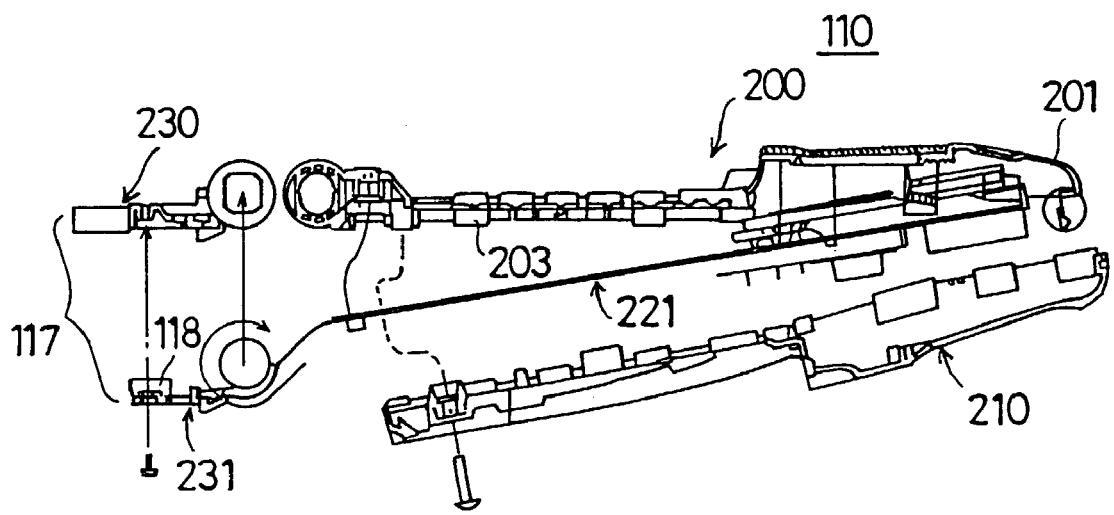
FIGS. 5A and 5B show the telephone set main body of FIG. 4 in detail.
Figure 5B:
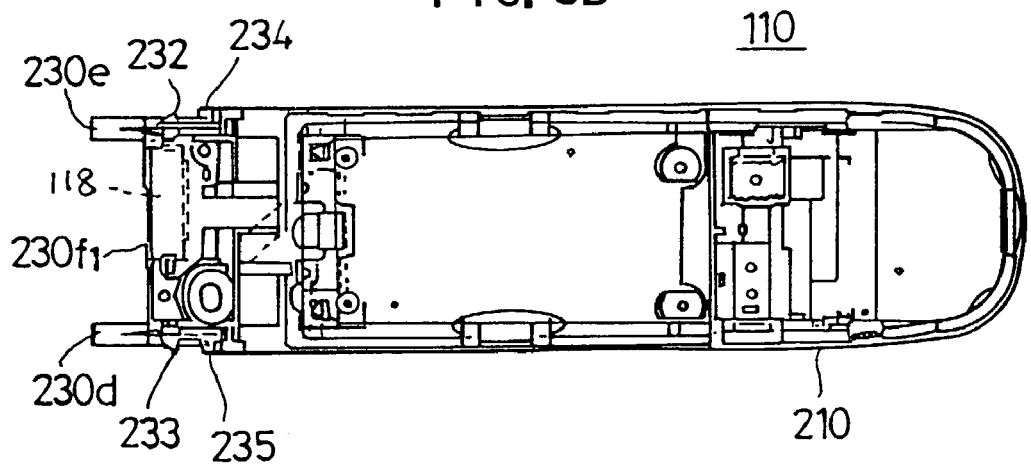

As shown in FIGS. 4, 5A and 5B, the telephone set main body 110 is constructed such that an upper housing module 200 and a lower housing module 210 sandwich a substrate module 220. The flipper joint plate 117 is pivotally secured to an end of the upper housing module 200 using the hinge modules 116a and 116b. In FIG. 4, the flipper joint plate 117 is shown in an enlarged view for clearer illustration.

The upper housing module 200 comprises an upper housing 201, a panel 202 and an operation button plate 203.

The substrate module 220 comprises a liquid crystal panel 221, a speaker 222, a microphone 223, connectors 224 and 225, and band-like flexible cables 226 and 227. An end of the flexible cable 226 is connected to the connector 224 so that the flexible cable 226 extends from the connector 224. The other end of the flexible cable 226 is provided with the telephone set main body connector 118. An end of the flexible cable 227 is connected to the connector 225 so that the flexible cable 227 extends from the connector 225. The other end of the flexible cable 227 is provided with the microphone 223.

The flipper joint plate 117 comprises a flipper joint plate main body 230, a cover 231 secured to the underside of the flipper joint plate main body 230 by screws, and the telephone set main body connector 118. The telephone set main body connector 118 is fixed to the flipper joint plate main body 230 by the cover 231 so as to be exposed at the end of the flipper joint plate 117.

The flipper joint plate main body 230 has integral therewith ring portions 230a and 230b, and a semi-cylindrical portion 230c. The upper housing 201 has ring portions 201a and 201b, and a semi-cylindrical portion 201c that match the ring portions 230a and 230b, and the semi-cylindrical portion 230c, respectively. The flipper joint plate main body 230 and the upper housing 201 are joined to each other such that the ring portions 230a and 230b, the semi-cylindrical portion 230c, the ring portions 201a and 201b, and the semi-cylindrical portion 201c are aligned with each other. The hinge module 116a engaged with the ring portion 230a and the ring portion 201a adjacent to each other, and the hinge module 116b engaged with the ring portion 230b and the ring portion 201b adjacent to each other pivotally support the flipper joint plate 117. An α-shaped loop 226a is formed in the middle of the flexible cable 226. The α-shaped loop 226a is accommodated in a portion between the semi-cylindrical portion 201c and the semi-cylindrical portion 231a that are adjacent to each other. The diameter of the α-shaped loop 226a is increased when the flipper 111 (150, 180) is open and decreased when the flipper 111 (150, 180) is closed so that the stress produced in the flexible cable 226 is restrained.

The flipper joint plate main body 230 is provided with arm portions 230d and 230e. The arm portions 230d and 230e are provided at respective ends that are opposite to the pivotally supported side of the flipper 230 so as to extend away from the pivotally supported side. A recess 230f is formed between the arm portions 230d and 230e. The telephone set main body connector 118 is exposed at a bottom 230f1 of the recess 230f.

The arm portions 230d and 230e are provided with longitudinally extending slits 230d1 and 230e1, respectively, at the periphery thereof.

Adjacent to the arms 230d and 230e are provided locking pawls 232 and 233 for locking the flipper 111 (150, 180), respectively, and operation buttons 234 and 235, respectively.

A description will now be given of the flipper 111.

Figure 6:
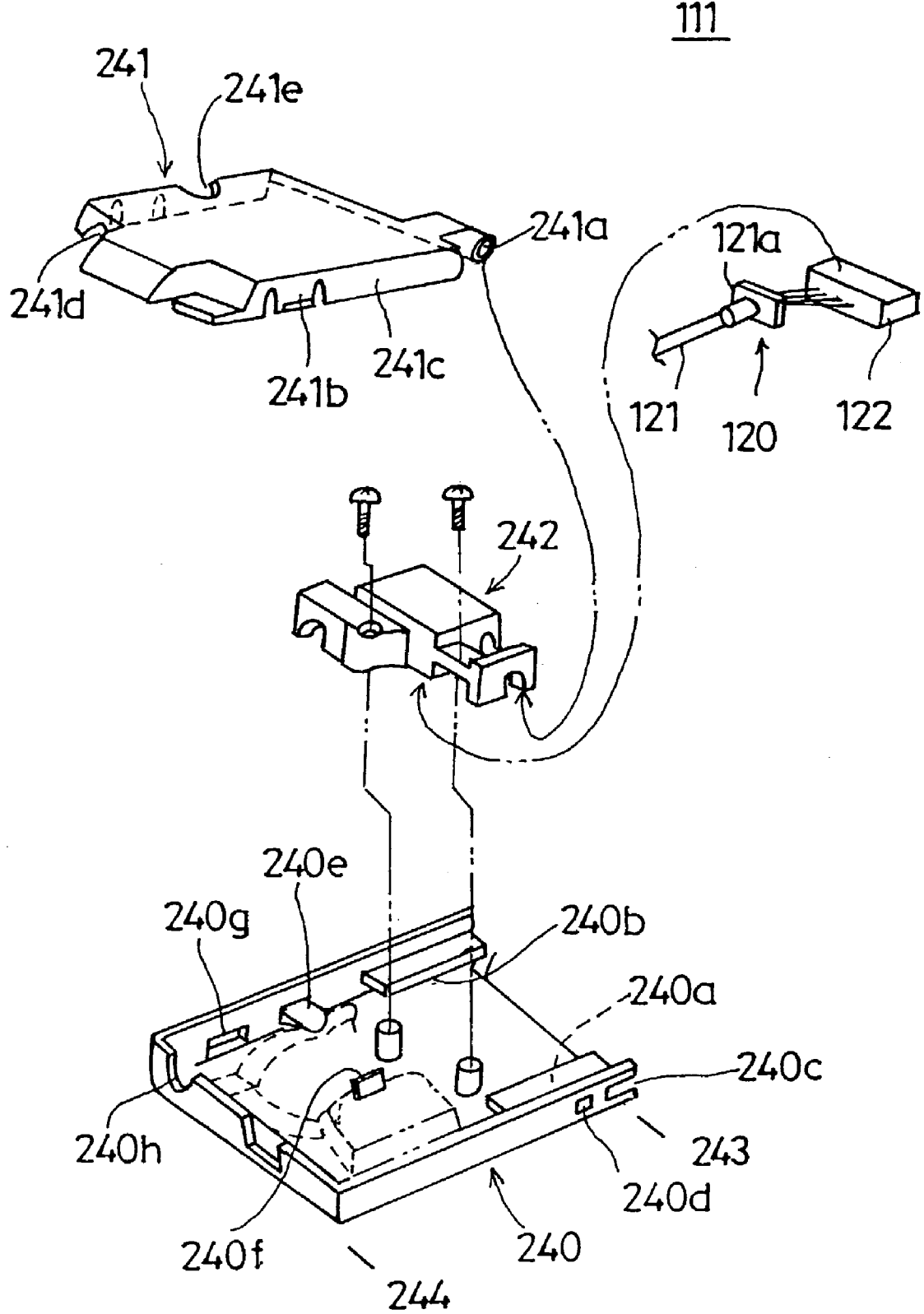
FIG. 6 shows a flipper of FIG. 3 with parts broken away.

As shown in FIG. 6, the flipper 111 comprises a flipper main body 240, an openable and closable cover 241 pivotally secured to the flipper main body 240, the short cable 120 and a holder member 242. When the cover 241 is closed, the cable accommodating portion 119 is formed. The flipper 111 is connected to the flipper joint plate 117 at a joint end 243. Numeral 244 indicates an end opposite to the end 243.

The flipper main body 240 is provided on the joint end 243 with guide passages 240a and 240b extending along the interior surface thereof, a notch 240c engageable with the operation button 234, and an engaging hole 240d engageable with the locking pawl 232. A notch and an engaging hole on the other side are not shown.

Figure 8A:
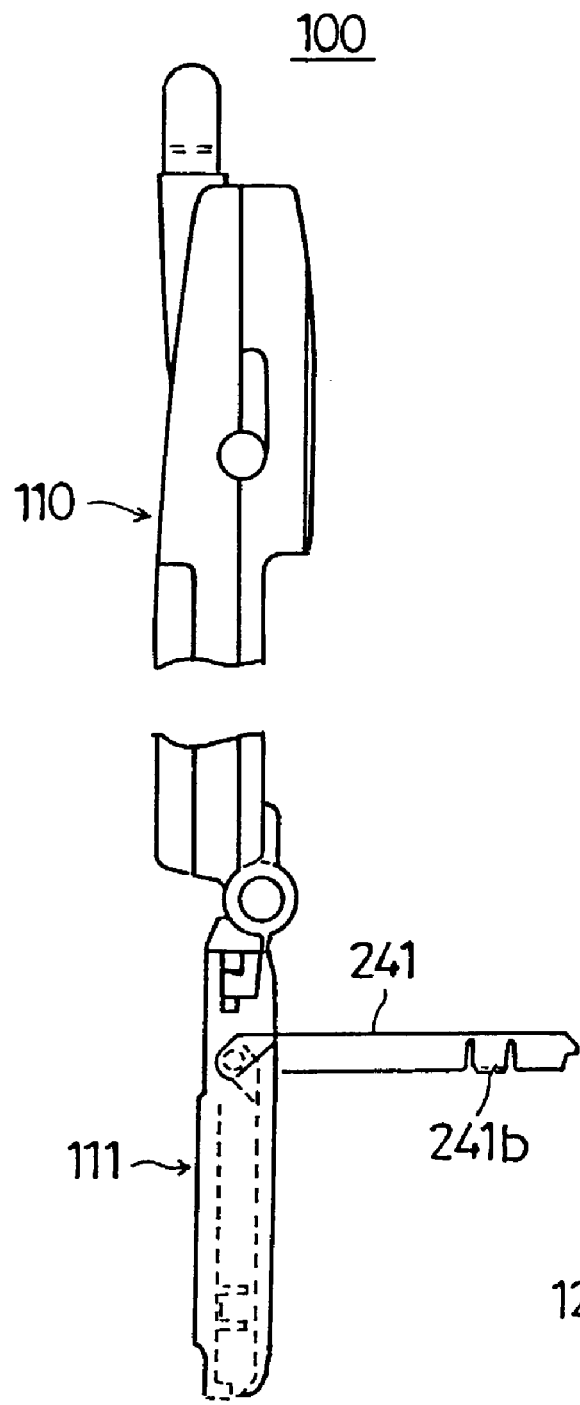
FIGS. 8A and 8B show how the portable telephone set of FIG. 3 is operated for mobile communication.
Figure 8B:
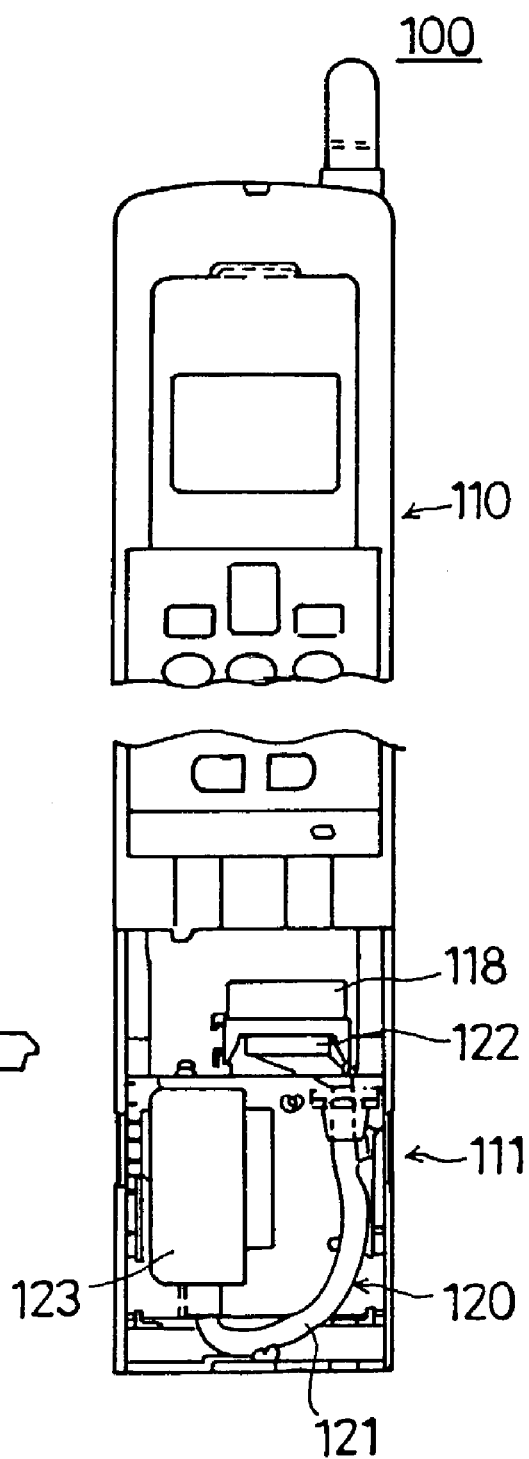

A holder member 242 secured to the interior of the flipper main body 240 holds the connector 122 of the short cable 120 and a joint portion 121a of the short cable main body 121 adjacent to the connector 122 in their places. A shaft portion 241a of the cover 241 is also secured in its place by the holder member 242. As shown in FIG. 8B, the short cable main body 121 and the connector 123 of the short cable 120 are accommodated in the interior of the flipper main body 240. The short cable main body 121 is appropriately bent such that it is guided under a cable holding portion 240e projecting toward the interior of the flipper main body 240. The connector 123 is held between a rib 240f provided to extend along the periphery of the connector 123 and the inner wall of the flipper main body 240 such that the terminals faces the interior of the flipper main body 240.

The cover 241 is rotatable around the shaft portion 241*a*. When the cover 241 covers the cable accommodating portion 119 locking pawls 241*b* are engaged with recesses 240*g* at the respective surfaces of the inner wall-of the flipper main body 240. The cover 241 covers the short cable 121 and the connector 123 when it is closed. Since the cover 241 is provided with side plates 241*c* immediately adjacent to the locking pawls 241*b*, it is unlikely that a finger of a user is caught on the locking pawl 241*b*. Thus the locking pawl 241*b* is prevented from being broken.

The cover 241 is also provided with notches 241*d* and 241*e* for pulling the short cable 121. The flipper main body 240 is provided with a notch 240*h* at a position that corresponds to the notch 241*d*.

The guide passages 240*a* and 240*b* of the flipper 111 are engaged with the arm portions 230*d* and 230*e* of the flipper joint plate 117, respectively. The flipper 111 is mechanically coupled to the flipper joint plate 117 (telephone set main body 110) by the engaging holes 240*d* being engaged with the locking pawls 232 and 233 and is electrically connected to the flipper joint plate 117 (the telephone set main body 110) by the connector 122 being connected to the telephone set main body connector 118. Thus, the portable telephone set 100 is constructed.

Figure 7:
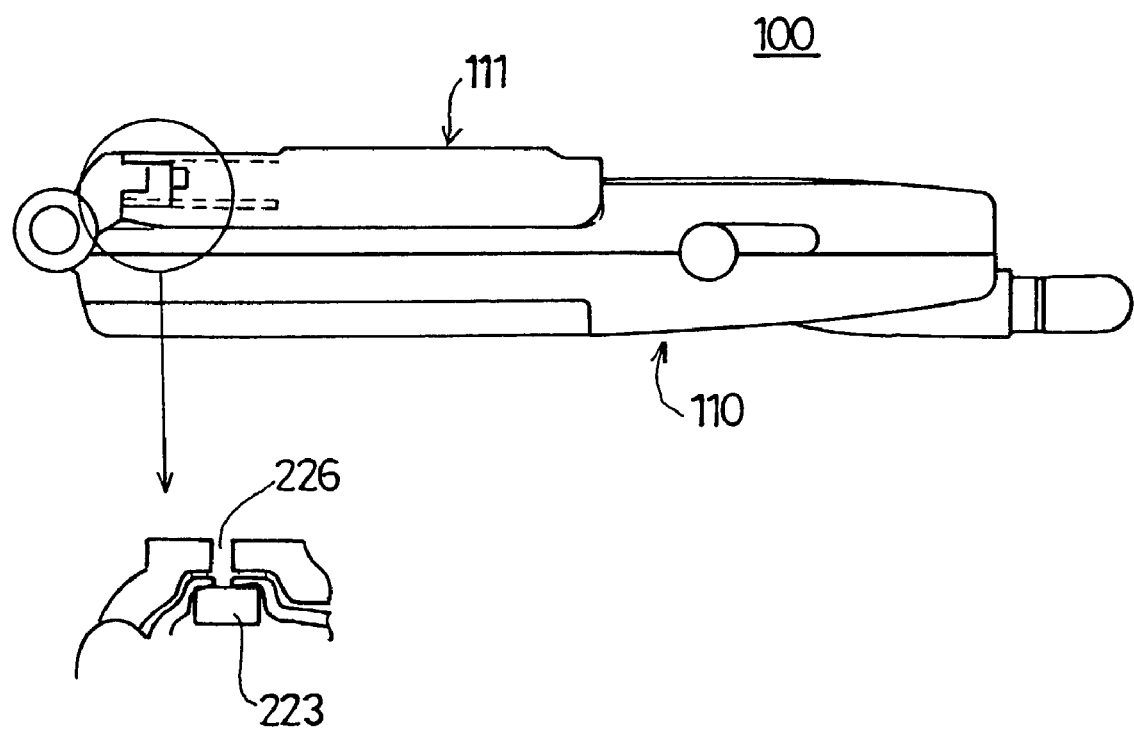
FIG. 7 shows the portable telephone set of FIG. 3 with the flipper being closed.

As shown in FIG. 7, the flipper 111 is normally closed so as to cover the operation buttons 113 of the telephone set main body 110. A portion of the flipper 111 that corresponds to the microphone 223 is provided with an opening 226.

A description will now be given of how the portable telephone set 100 is used.

When a telephone call is to be made, the flipper 111 is opened so that an appropriate operation is performed.

Figure 9A:
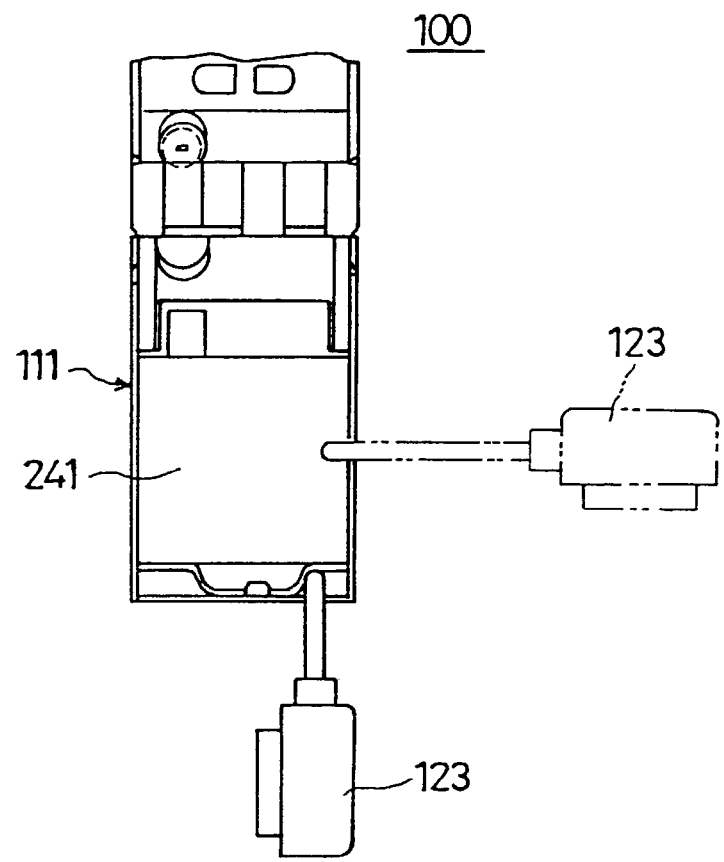
FIG. 9A shows an operation to be performed after the operation of FIGS. 8A and 8B.
Figure 9B:
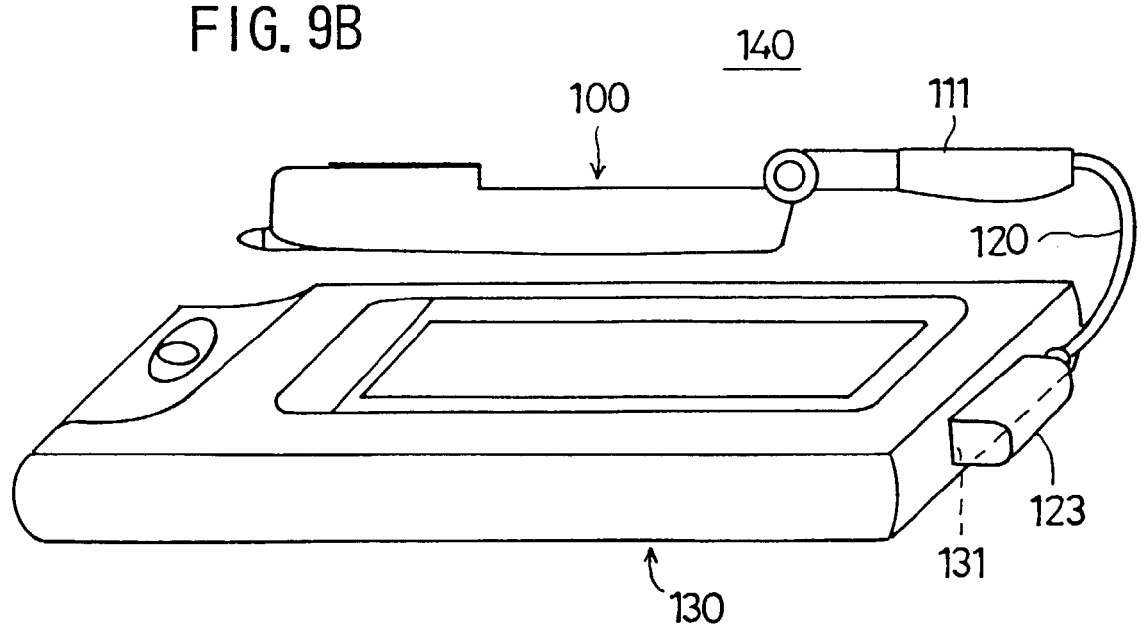
FIG. 9B shows a mobile communication system.

When mobile communication is to be performed, the mobile information processing device 130 having a built-in data communication adaptor as shown in FIG. 9B is taken out of the bag. The flipper 111 of the portable telephone set 100 is opened. The user applies a finger to the end of the cover 241 so as to open the cover 241 as indicated by the solid line in FIG. 8A and takes out the short cable 120 from the cable accommodating portion 119 and closes the cover 241 as indicated by the broken line in FIG. 8A. The short cable 120 may be guided through the notches 241*d* and 240*h* so as to extend from the end of the flipper 111. As indicated by the alternate long and two short dashes line in FIG. 9A, the short cable 120 may alternatively be led out from the side of the flipper 111 via the notch 241*e*.

As shown in FIG. 9*b*, the connector 123 at the end of the short cable 120 is connected to the connector 131 of the mobile information processing device 130.

Thus, the mobile communication system 140 enabling mobile communication is built.

[Portable Telephone Set 100A According to the Second Embodiment]

FIGS. 10A and 10B show the portable telephone set 100A. Like the flipper 111 already described, the flipper 150 is mechanically and electrically connected to the telephone set main body 110. As shown in FIG. 10B, the short cable 152 is accommodated in the flipper 150.

When a telephone call is to be performed, the flipper 150 is opened so that an appropriate operation is performed.

When mobile communication is to be performed, the mobile information processing device 170 as shown in FIG. 11 not having a built-in data communication adaptor is taken out of the bag. The data communication adaptor 160 is inserted into the mobile information processing device 170. As shown in FIGS. 10A and 10B, the flipper 150 of the portable telephone set 100A is opened so as to open the cover 241. The short cable 152 is taken out of the cable accommodating portion 151, whereupon the cover 241 is closed. The short cable 152 may be taken out in either of the two directions.

Subsequently, as shown in FIG. 11, the connector 153 at the end of the short cable 152 is connected to the connector 161 of the data communication adaptor 160 inserted into the mobile information processing device 170 not having a built-in data communication adaptor.

Thus, the mobile communication system 140A enabling mobile communication is built.

[Portable Telephone Set 100B According to the Third Embodiment]

Figure 12:
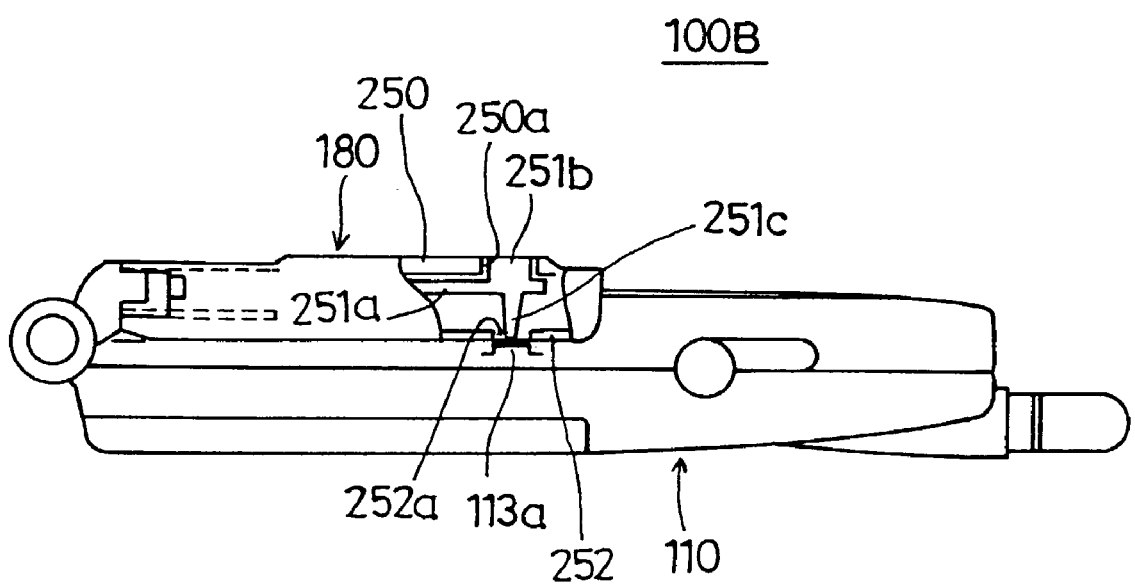
FIG. 12 shows a portable telephone set according to the third embodiment.

The portable telephone set 100B comprises the telephone set main body 110 and the flipper 180. As shown in FIG. 12, the flipper 180 comprises a flipper main body 250, an operation button member 251 fixed to the interior of the flipper main body 250, and a cover 252 fixed to the interior of the flipper main body 250 and covering the operation button member 251. The operation button member 251 is formed of rubber and is provided with three arm portions 251*a* parallel with each other. A button portion 251*b* is provided on the underside of each of the arm portions 251*a*, and a projection 251*c* is provided on each of the arm portions 251*a*. The flipper main body 250 is provided with openings 250*a* corresponding to the button portions 251*b*. The cover 252 is provided with openings 252*a* corresponding to the projections 251*c*. The button portion 251*b* is engaged with the opening 250*a* and the projection 251*c* is located in the opening 252*a*.

Like the flipper 111 already described, the flipper 180 is mechanically joined to the telephone set main body 110.

By pressing the button portion 251*b* while the flipper 180 is being closed, three main buttons 113*a*, 113*b* and 113*c* of the operation buttons 113 are pressed.

[Portable Telephone Set 100C According to the Fourth Embodiment]

Figure 14B:
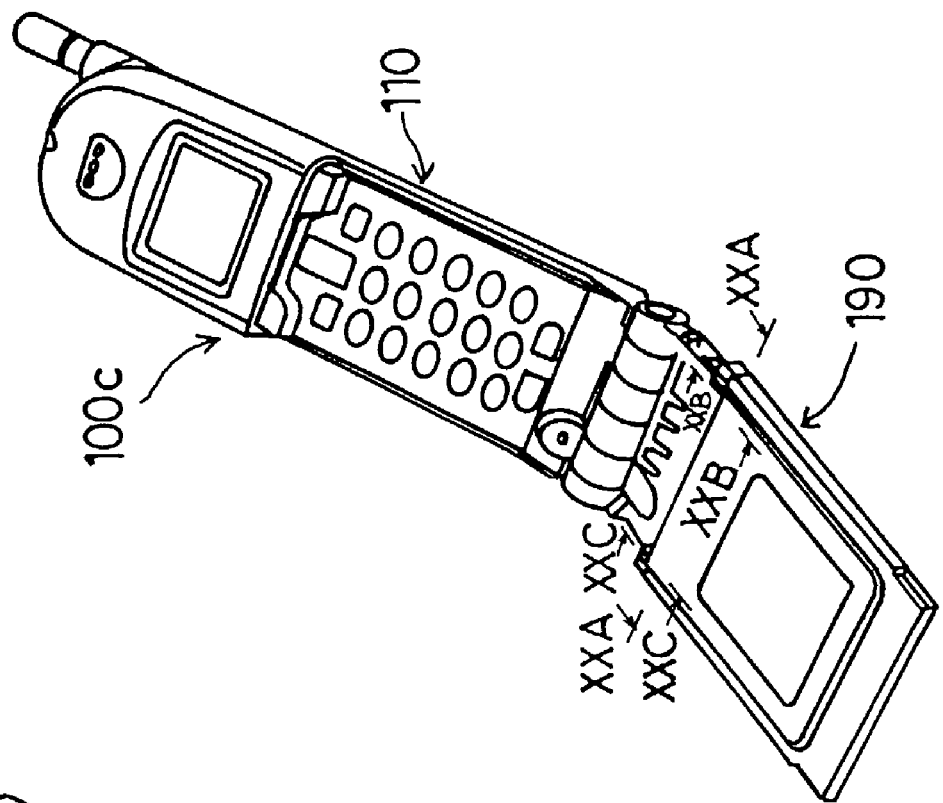
FIGS. 14A and 14B show a portable telephone set according to the fourth embodiment.
Figure 14A:
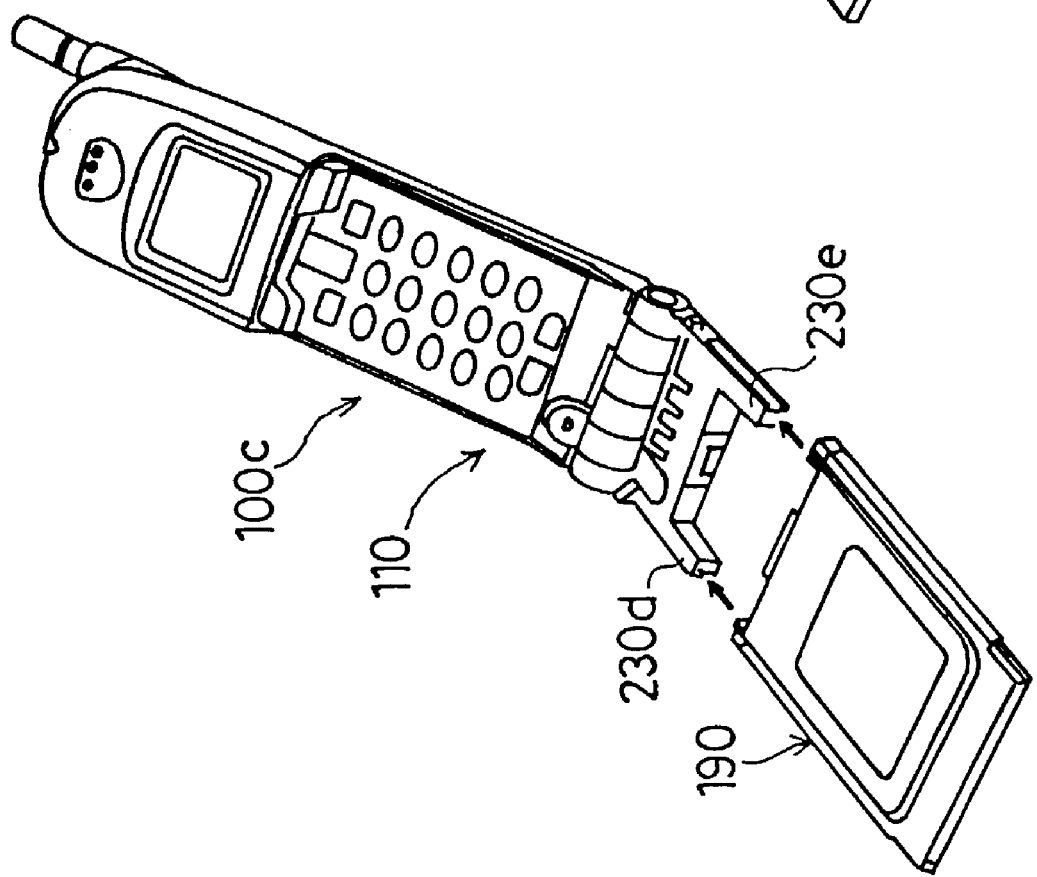

The portable telephone set 100C according to the fourth embodiment includes the telephone set main body 110 as shown in FIG. 14A.

Figure 15:
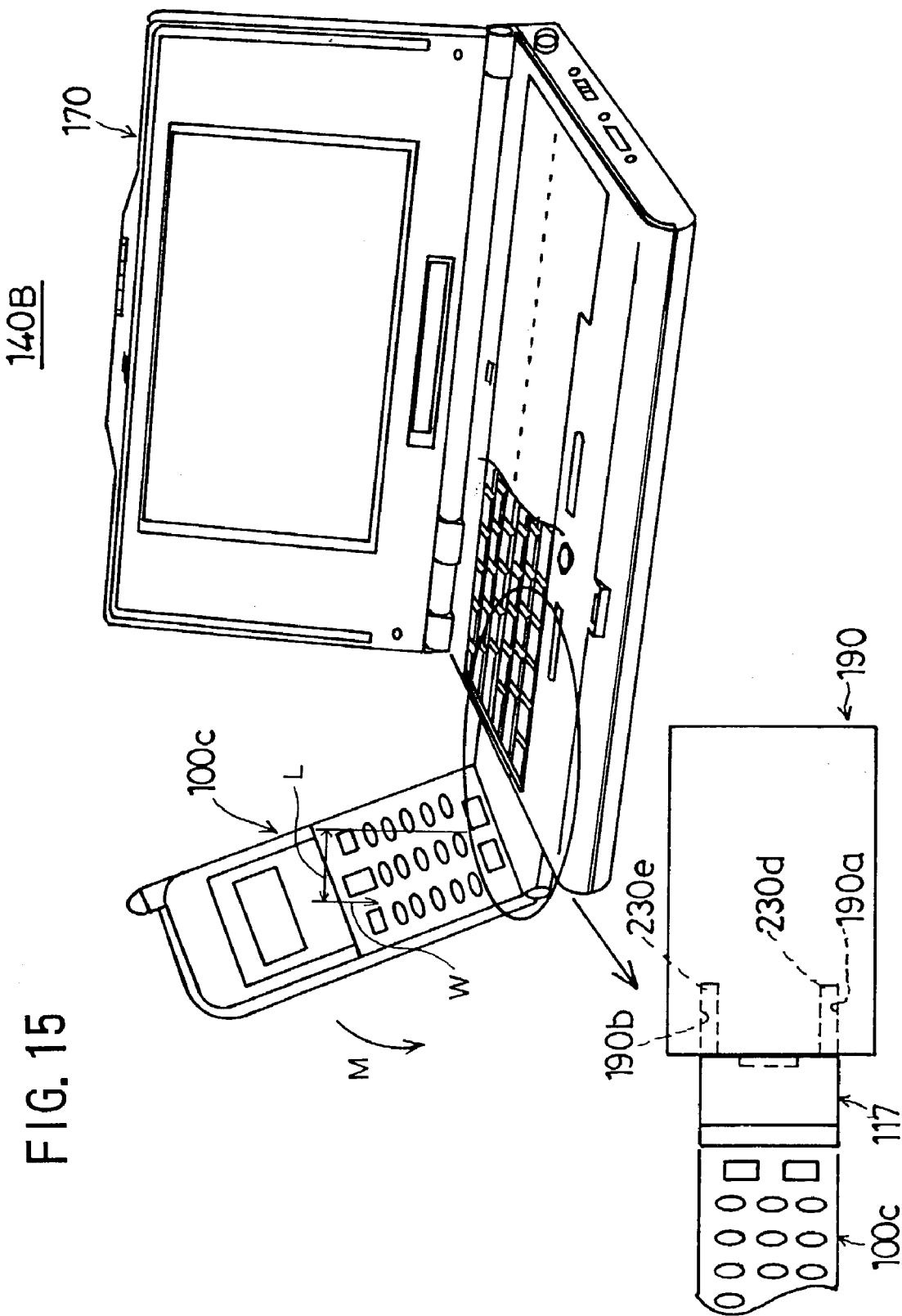
FIG. 15 shows a mobile communication system using the portable telephone set of FIG. 14A.
Figure 16:
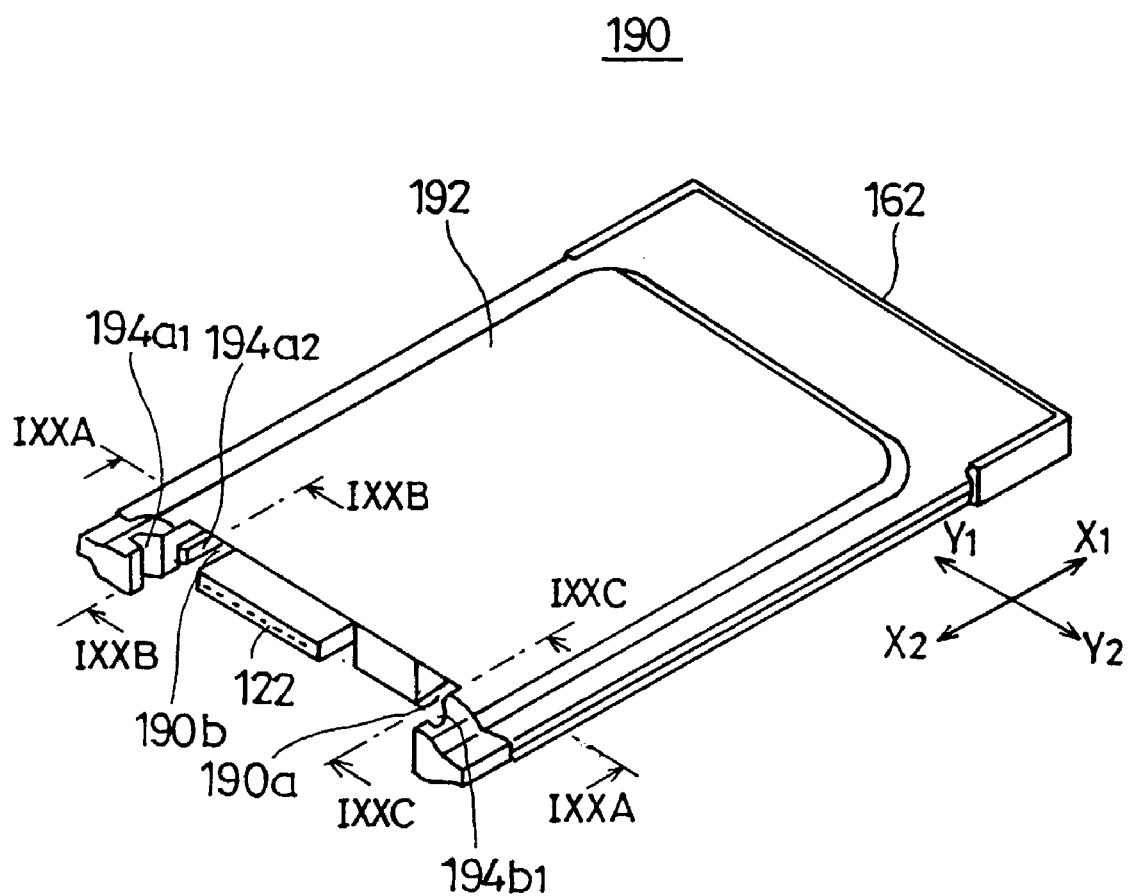
FIG. 16 shows a data communication adaptor.

As shown in FIGS. 14A, 14B and 15, when mobile communication is to be performed, the data communication adaptor 190 is mechanically joined to the flipper joint plate 117 of the telephone set main body 110. The connector 122 is connected to the telephone set main body connector 118 for electrical connection.

Subsequently, as shown in FIG. 15, the data communication adaptor 190 joined to the telephone set main body 110 is inserted into the data communication adaptor accommodating unit 171A. The connector 162 is connected to the connector 172 so that the data communication adaptor 190 is connected to the information processing device 170A. Thus, the mobile communication system 140B is built.

The data communication adaptor 190 is provided with holes 190*a* and 190*b* at respective sides thereof. The holes 190*a* and 190*b* are engaged with the arm portions 230*d* and 230*e* so that connection between the flipper joint plate 117 and the data communication adaptor 190 is reinforced.

[Variations]

In the above-described embodiments, the telephone set main body 110 is provided with a removable flipper. However, the flipper may be permanently attached to the telephone set main body 110. In a portable telephone set in which a flipper is removable, the telephone set main body connector 118 is provided at the end of the flipper. In a portable telephone set in which a flipper is not removable, the telephone set main body connector 118 may be provided in the telephone set main body. That is, the connector 118 may constitute a part of the portable telephone set.

[Data Communication Adaptor 190 According to the Fifth Embodiment]

The data communication adaptor 190 shown in FIG. 14A has a construction as shown in FIGS. 16–20C.

Figure 18:
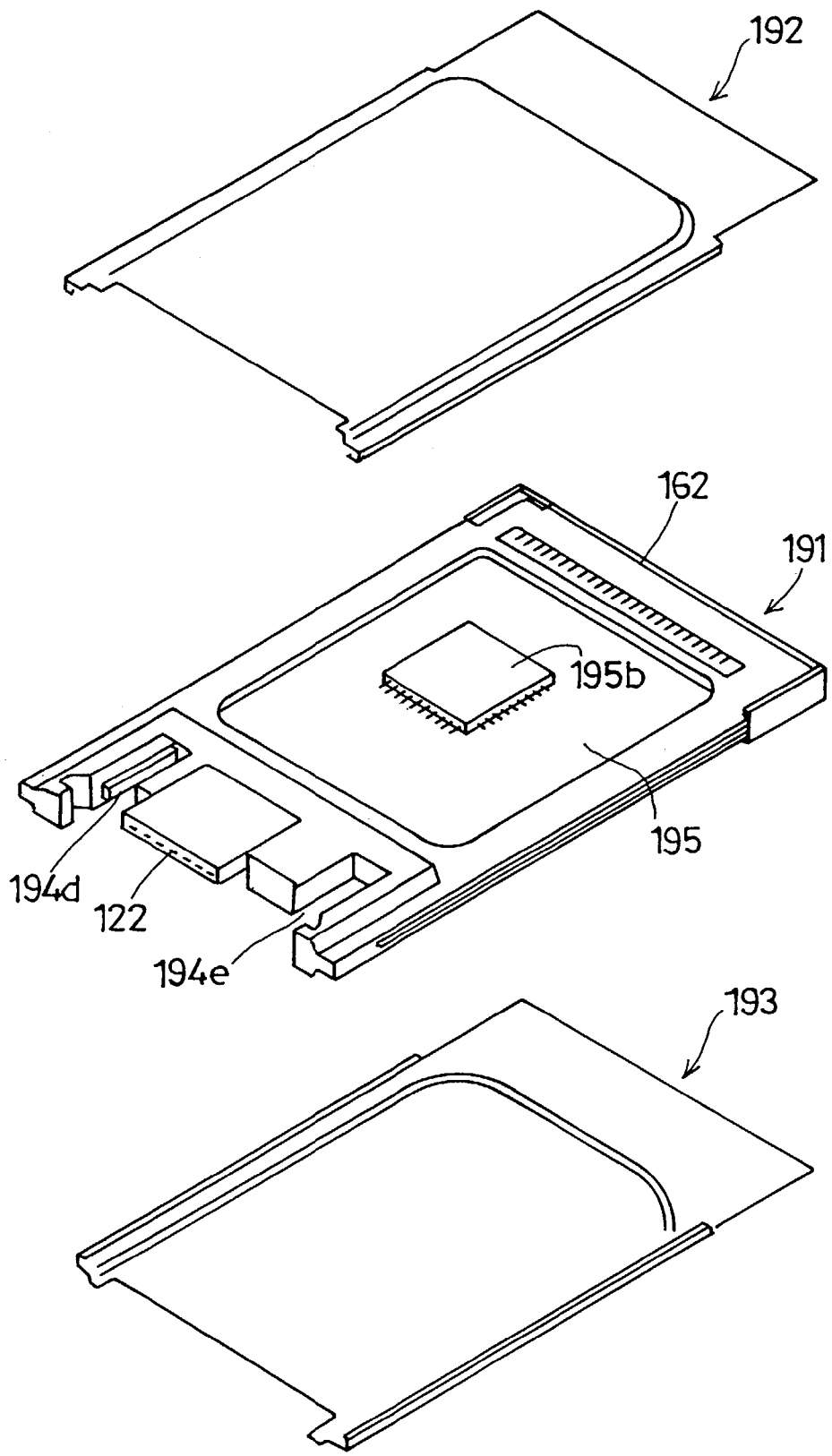
FIG. 18 is an exploded perspective view of the data communication adaptor.

The data communication adaptor 190 functions as a PCMCIA card. As shown in FIG. 18, the data communication adaptor 190 comprises a main body 191 and metal shield covers 192 and 193 that cover the upper and lower surfaces of the main body 191, respectively.

Figure 19:
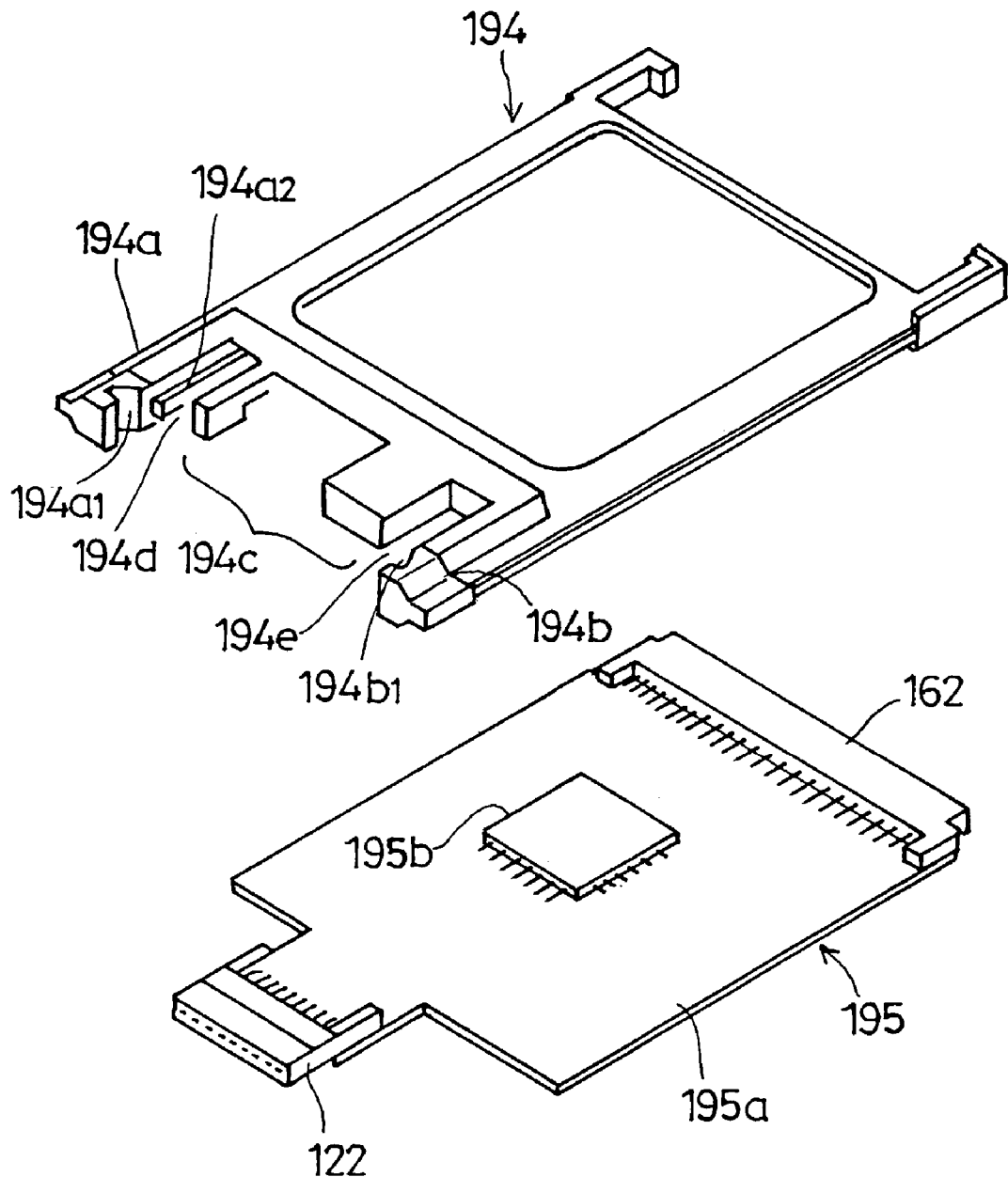
FIG. 19 is an exploded perspective view of a adaptor main body of FIG. 18.

As shown in FIG. 19, the main body 191 is constructed such that a printed circuit module 195 is combined with a frame 194. The printed circuit module 195 is constructed such that a plurality of electronic parts 195b are mounted on the upper and lower surfaces of a printed circuit board 195a. The connector 122 connected to a portable telephone set is attached to the X2 end of the printed circuit board 195a and the connector 162 connected to the mobile information processing device is attached to the X1 end of the printed circuit board 195a. The frame 194 is configured to adapt for the printed circuit module 195. At the X2 end, the frame 194 is provided with arm portions 194a and 194b projecting in the X2 direction at the Y1 end and the Y2 end, respectively. A connector accommodating portion 194c accommodating the connector 122 is formed between the arm portions 194a and 194b. A incision 194d extending in the Z1–Z2 direction is provided between the arm portion 194a and the connector accommodating portion 194c, and a incision 194e also extending in the Z1–Z2 direction is provided between the arm portion 194b and the connector accommodating portion 194c.

Figure 20A:
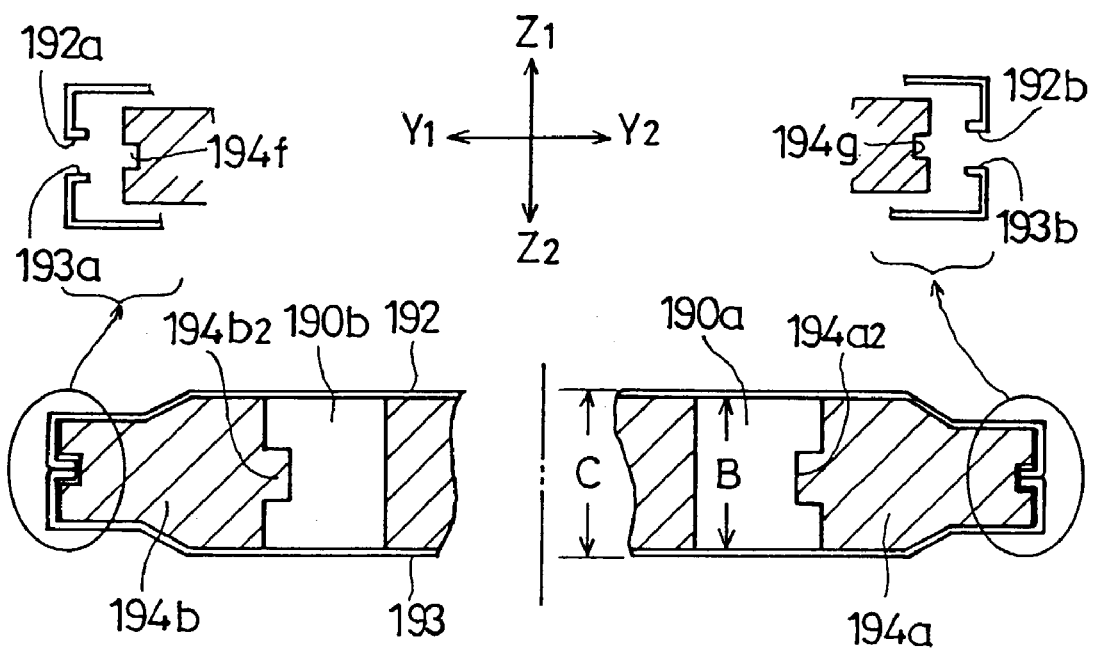
FIG. 20A is an enlarged section taken along IXXA—IXXA of FIG. 16.

As shown in FIG. 20A, the shield cover 192 is provided with bent portions 192a and 192b at the Y1 and Y2 ends, respectively. The bent portions 192a and 192b are configured to be engageable with grooves 194f and 194g, respectively, provided at the Y1 and Y2 ends of the frame 194, respectively. The shield cover 193 is provided with bent portions 193a and 193b at the Y1 and Y2 ends, respectively. The bent portions 193a and 193b are also configured to be engageable with the grooves 194f and 194g, respectively, provided at the Y1 and Y2 ends of the frame 194, respectively. The shield covers 192 and 193 are electrically connected to the ground of the printed circuit module 195 and hermetically seal the printed circuit module 195.

Figure 20B:
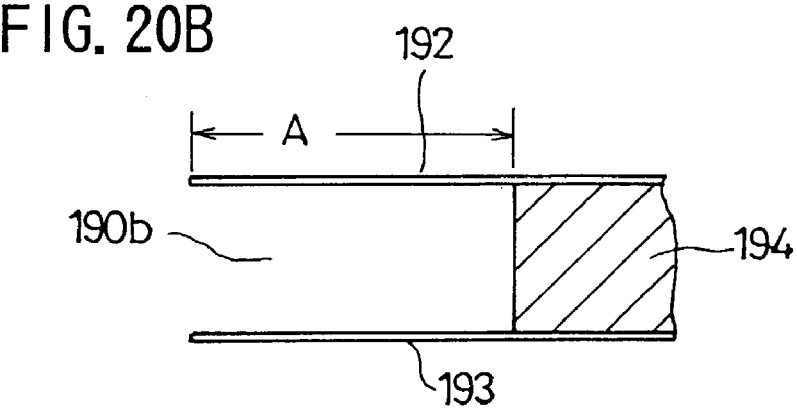
FIG. 20B is an enlarged section taken along IXXB—IXXB of FIG. 16.
Figure 20C:
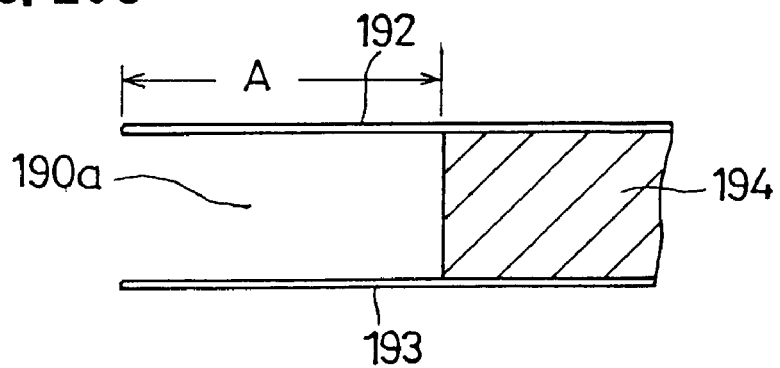
FIG. 20C is an enlarged section taken along IXXC—IXXC of FIG. 16.

The Z1 and Z2 ends of the incisions 194d and 194e are covered by respective portions of the shield covers 192 and 193. As shown in FIGS. 20A and 20B, the incision 194d and the shield covers 192 and 193 form the hole 190a. As shown in FIGS. 20A and 20C, the incision 194e and the shield covers 192 and 193 form the hole 190b. Each of the holes 190a and 190b has a relatively large depth A. The Z1 and Z2 end walls of the holes 190a and 190b have a relatively high mechanical strength since they are formed by respective portions of the shield covers 192 and 193. The holes 190a and 190b constitute a mechanical supporting mechanism as claimed.

To insure locking of the data communication adaptor 190, the arm portions 194a and 194b for locking of the data communication adaptor 190 are provided with recesses 194a1 and 194b1, respectively, at the inner surfaces thereof and also provided with rib portions 194a2 and 194b2, respectively, extending in the X1–X2 direction.

The data communication adaptor 190 is provided with the connector 122 at the X2 end thereof and the connector 162 at the X1 end thereof.

In order to perform mobile communication, the data communication adaptor 190 is connected to the flipper joint plate 117 of the telephone set main body 110 such that the connector 122 is connected to the telephone set main body connector 118. Subsequently, the data communication adaptor 190 connected to the telephone set main body 110 is inserted into the data communication adaptor accommodating unit 171A such that the connector 162 is connected to the connector 172 for connection with the mobile information processing device 170A. Thus, the mobile communication system 140B is built. The end of each of the shield covers 192 and 193 is electrically connected to the ground terminal (not shown) exposed in the data communication adaptor accommodating unit 171A of the mobile information processing device 170A.

As shown in FIG. 15, while mobile communication is being performed by the mobile communication system 140B, the telephone set main body 110 is located adjacent to the mobile information processing device 170A so that a predetermined moment M that acts to bend a joint between the connector 122 and the telephone set main body connector 118 is exerted on the joint. The moment M is given by (W, which is a sum of the weight of the telephone set main body 110, the force exerted on the telephone set main body 110 for operation thereof, an external force exerted on the telephone set main body 110)×(L which is the length of an arm extending from the joint between the connector 122 and the telephone set main body 118 to the center of gravity of the telephone set main body 110). The mechanical supporting mechanism as mentioned above bears the moment M so that a bending force is prevented from being exerted on the joint between the connector 122 and the telephone set main body connector 118.

A description will now be given of how the holes 190a and 190b provide a mechanical support.

Figure 21A:
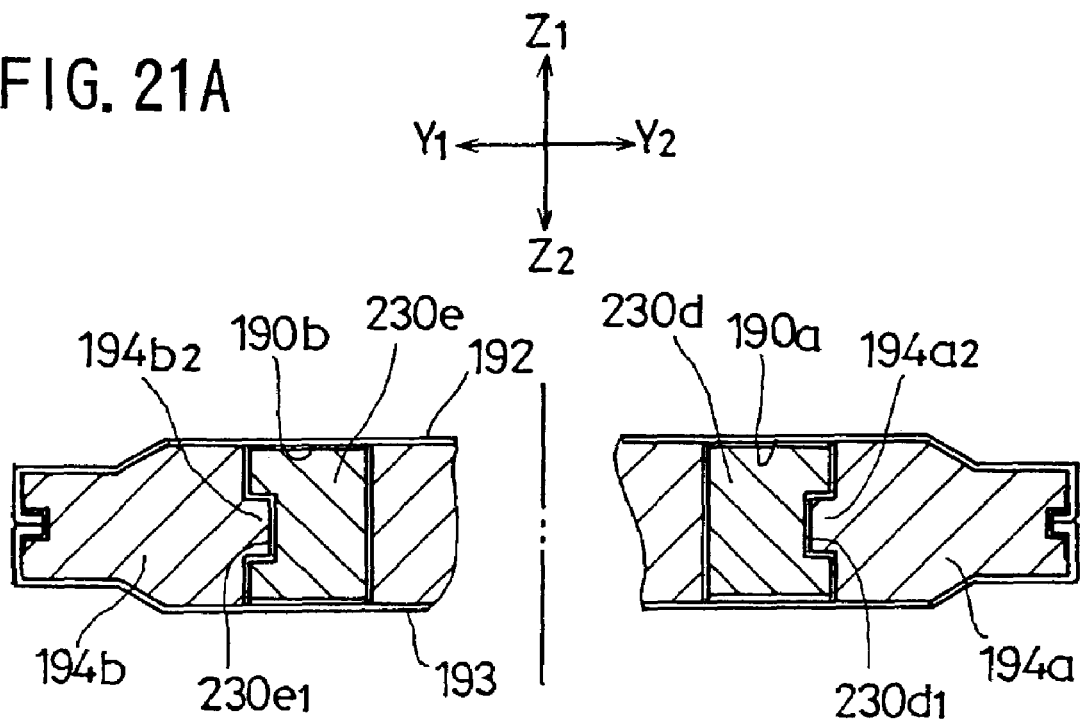
FIG. 21A is an enlarged section taken along XXA—XXA of FIG. 14B.
Figure 21B:
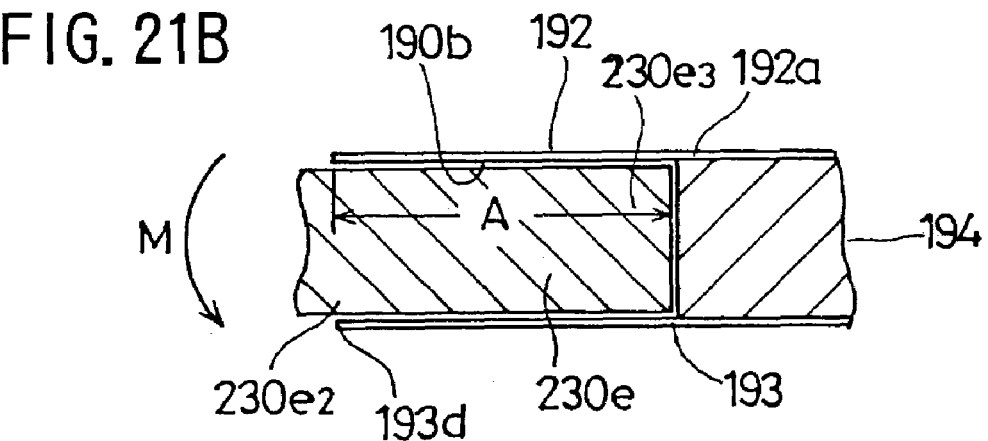
FIG. 21B is an enlarged section taken along XXB—XXB of FIG. 14B.
Figure 21C:
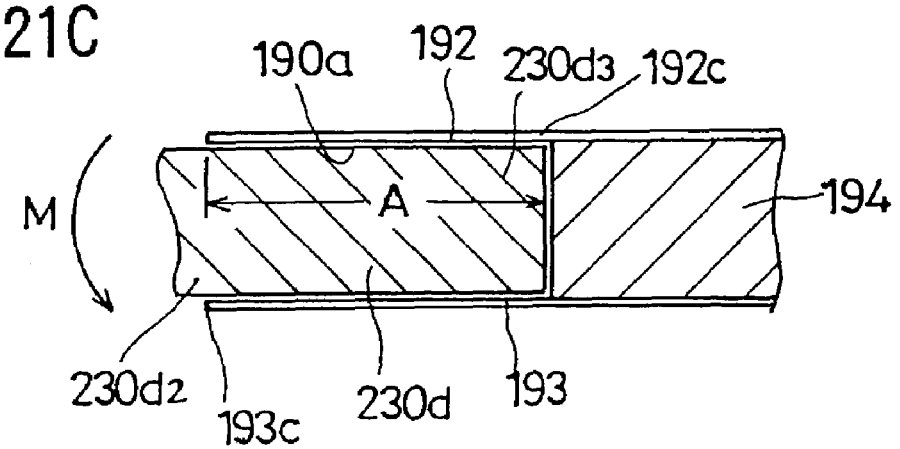
FIG. 21C is an enlarged section taken along XXC—XXC of FIG. 14B.

When the mobile communication system 140B has been built as shown in FIG. 14B, the arm portion 230d is inserted into the hole 190a by the distance A so as to come into contact with the rear end thereof, and the arm portion 230e is inserted into the hole 190b by the distance A so as to come into contact with the rear end thereof, as shown in FIGS. 21A, 21B and 21C. FIGS. 21A, 21B and 21C also show that the rib portion 194a2 is engaged with the slit 230d1, the rib portion 194b2 is engaged with the slit 230e1, the recess 194a1 is engaged with the locking pawl 232, and the recess 194b1 is engaged with the locking pawl 233.

The moment M is born such that, as shown in FIG. 21C, an edge 193c of the shield cover 193 facing an exit of the hole 190a bears a base 230d2 of the arm portion 230d and an edge 192c of the shield cover 192 facing a rear end of the hole 190a bears an end 230d3 of the arm portion 230d, and, as shown in FIG. 21B, an edge 193d facing an exit of the hole 190b bears a base 230e2 of the arm portion 230e and an edge 192d facing a rear end of the hole 190b bears an end 230e3 of the arm portion 230e. In this way, the arm portions 230d and 230e are supported at two locations at the Y1 and Y2 ends, respectively.

As shown in FIG. 21A, the moment M is also born by the engagement of the rib portions 194a2 and 194b2 with the slits 230d1 and 230e1, respectively.

The metal shield covers 192 and 193 with which the arm portions 230d and 230e come into contact are known to have a relatively large rigidity. The distance B in the Z1–Z2 direction of the holes 190a and 190b is substantially identical to the thickness C of the data communication adaptor 190. Thus, the thickness of the arm portions 230d and 230e is relatively large. Accordingly, the mechanical support provided by the holes 190a and 190b is sufficient to bear the moment M. Thus, the joint between the connector 122 and the telephone set main body connector 118 is free from a bending force. Thus, the connection between the connector 122 and the telephone set main body connector 118 is prevented from being loosened. It is unlikely that the connector 122 and the telephone set main body connector 118 are bent while the connection is established or that terminals of the connector 122 or the telephone set main body connector 118 are damaged. Thus, the life of the connectors 122 and 118 is prevented from being excessively reduced.

[Variation of the Telephone Set Main Body]

FIG. 22A shows a telephone set main body 110A which is a variation of the telephone set main body 110 of FIG. 3. The telephone set main body 110A comprises the liquid crystal display unit 112, the operation buttons 113 and the antenna 114. A connector 350 is provided at the lower end of the telephone set main body 110A.

A connection adaptor 351 is used for the telephone set main body 110A. The connection adaptor 351 comprises the hinge mechanism 115 and the flipper joint plate 117. A connector 352 is provided on the upper end of the connection adaptor 351.

The connection adaptor 351 is used to connect the data communication adaptor 190 to the telephone set main body 110A.

The data communication adaptor 190 is connected to the telephone set main body 110A such that the connector 352 is connected to the connector 350 so that the connection adaptor 351 is electrically and mechanically connected to the lower end of the telephone set main body 110A. The data communication adaptor 190 is then connected to the flipper joint plate 117 of the connection adaptor 351. Thus, a data communication system as shown in FIG. 22B results. The mechanical supporting mechanism is operated as described already.

The present invention is not limited to the above described embodiments, and variations and modifications may be made without departing from the scope of the present invention.

What is claimed is:

1. A portable data communication adaptor used for data communication when a portable telephone set is coupled to a mobile information processing device, comprising:
  an adaptor main body;
  a portable telephone set connector fixed to said adaptor main body and electrically and releasably connectable to one of a portable telephone set and a connection adaptor, said connection adaptor electrically connected to the portable telephone set, thereby providing a temporary connection between said portable telephone set connector and one of said portable telephone set and said connection adaptor;
  a mobile information processing device connector, fixed to said adaptor main body and different from said portable telephone set connector, and electrically connectable to a mobile information processing device; and
  a mechanical supporting mechanism which is configured to mechanically maintain a state where said portable telephone set connector is electrically and mechanically connected to one of said portable telephone set and said connection adaptor and to provide a mechanical support to the portable telephone set when said mobile information processing device connector is electrically connected to said information processing device, so as to support at least the weight of the portable telephone set,
  wherein said portable data communication adaptor is inserted into said information processing device when said mobile information processing device connector is electrically connected to said information processing device.

2. The data communication adaptor as claimed in claim 1, wherein said mechanical supporting mechanism comprise holes, in said adaptor main body, configured to receive arm portions projecting from one of said portable telephone set and the connection adaptor.

3. A portable data communication adaptor used for data communication when a portable telephone set is coupled to a mobile information processing device, comprising:
  an adaptor main body;
  a portable telephone set connector fixed to said adaptor main body and electrically connectable to one of a portable telephone set and a connection adaptor, said connection adaptor electrically connected to the portable telephone set;
  a mobile information processing device connector fixed to said adaptor main body and electrically connectable to a mobile information processing device; and
  a mechanical supporting mechanism configured to mechanically maintain a state where said portable telephone set connector is electrically and mechanically connected to one of said portable telephone set and said connection adaptor;
  said mechanical supporting mechanism being embodied by holes to which arm portions, projecting comprising holes, in said adaptor main body, configured to receive arm portions projecting from one of said portable telephone set and the connection adaptor, are inserted;
  each of said holes being defined by an inner surface of said adaptor main body with a rib portion engageable with a groove on a side of each of said arm portions.

4. A portable data communication adaptor used for data communication when a portable telephone set is coupled to a mobile information processing device, comprising:
  an adaptor main body;
  a top shield plate fanned of a metal and configured to cover an upper major surface of said adaptor main body; and
  a bottom shield plate formed of a metal and configured to cover a lower major surface of said adaptor main body,
  wherein said adaptor main body comprises:
  a portable telephone set connector electrically connectable to one of the portable telephone set and a connection adaptor, said connection adaptor electrically connected to the portable telephone set; and
  a mobile information processing device connector electrically connectable to a mobile information processing device,
  and wherein said portable data communication adaptor further comprises:
  a mechanical supporting mechanism configured to receive arm portions projecting from one of the portable telephone set and the connection adaptor and to mechanically support said data communication adaptor with respect to one of the portable telephone set and the connection adaptor, said mechanical supporting mechanism comprising holes defined by incisions provided in said adaptor main body and by portions of said top shield plate and said bottom shield plate covering said incisions.

5. The data communication adaptor as claimed in claim 4, wherein each of said incisions in said adaptor main body is provided at on an inner surface thereof with a rib portion engageable with a groove provided on a side of each of said arm portions.

* * * * *